(12) United States Patent
Khanapurkar

(10) Patent No.: US 10,242,404 B2
(45) Date of Patent: Mar. 26, 2019

(54) SYSTEM, METHOD, AND APPARATUS FOR PROVIDING A PREDICTION-BASED MARKETPLACE

(71) Applicant: Paresh Ashok Khanapurkar, Plano, TX (US)

(72) Inventor: Paresh Ashok Khanapurkar, Plano, TX (US)

(*) Notice: Subject to any disclaimer, the term of this patent is extended or adjusted under 35 U.S.C. 154(b) by 602 days.

(21) Appl. No.: 13/870,949

(22) Filed: Apr. 25, 2013

(65) Prior Publication Data

US 2013/0290159 A1 Oct. 31, 2013

Related U.S. Application Data

(60) Provisional application No. 61/639,996, filed on Apr. 30, 2012.

(51) Int. Cl.
*G06Q 40/04* (2012.01)
(52) U.S. Cl.
CPC .................... *G06Q 40/04* (2013.01)
(58) Field of Classification Search
CPC .... G06Q 30/08; G06Q 30/0275; G06Q 40/04; G06Q 40/00; G06Q 30/0202; G06Q 40/06; G06Q 50/22; G06Q 50/24; G06Q 90/00
USPC .................................................. 705/37, 26.3
See application file for complete search history.

(56) References Cited

U.S. PATENT DOCUMENTS

| | | | | |
|---|---|---|---|---|
| 6,021,397 A | * | 2/2000 | Jones et al. | ............... 705/36 R |
| 6,260,019 B1 | * | 7/2001 | Courts | ............... G06Q 10/0639 463/40 |
| 6,473,084 B1 | | 10/2002 | Phillips et al. | |
| 7,010,494 B2 | * | 3/2006 | Etzioni | ............... G06Q 10/02 705/400 |
| 7,155,510 B1 | | 12/2006 | Kaplan | |
| 7,392,212 B2 | * | 6/2008 | Hancock | ............... G06Q 40/00 705/35 |
| 7,451,213 B2 | | 11/2008 | Kaplan | |
| 7,693,778 B2 | * | 4/2010 | Nafeh | ............... G06Q 40/00 705/35 |

(Continued)

FOREIGN PATENT DOCUMENTS

WO WO-2011127206 A2 * 10/2011 ............. G06Q 10/04

OTHER PUBLICATIONS

INTRADE: How does INTRADE work? May 15, 2011, Web archives, pp. 1-4.*

(Continued)

*Primary Examiner* — Bijendra K Shrestha
(74) *Attorney, Agent, or Firm* — Eugenio J. Torres-Oyola; Victor M. Rodriguez-Reyes; Ferraiuoli LLC

(57) ABSTRACT

Provided is a system, method, and apparatus for implementing a prediction-based marketplace. For example, the system may include one or more processing units operable to: receive a prediction for an outcome of an event from a seller, determine a price to offer the prediction for sale to the buyer, provide the prediction to a buyer, receive an indication by the buyer to purchase the prediction, process a payment from the buyer to purchase the prediction, determine the actual outcome of the event that is predicted, compare the actual and predicted outcomes of the event; and distribute the payment in a manner so that the buyer and seller each receive a portion of the payment based on the comparison of the actual and predicted outcomes.

10 Claims, 16 Drawing Sheets

(56) References Cited

U.S. PATENT DOCUMENTS

| | | | |
|---|---|---|---|
| 7,882,006 B2 | 2/2011 | Gardner et al. | |
| 7,962,614 B2 | 6/2011 | Kaplan | |
| 7,991,728 B2 | 8/2011 | Kaplan | |
| 8,200,514 B1* | 6/2012 | Crean | G06Q 10/02 705/5 |
| 8,612,331 B2* | 12/2013 | Hanson | G06Q 30/0202 705/35 |
| 8,764,553 B2* | 7/2014 | Ginsberg | A63F 3/081 463/21 |
| 2001/0042785 A1* | 11/2001 | Walker et al. | 235/379 |
| 2003/0135445 A1 | 7/2003 | Herz et al. | |
| 2003/0139989 A1* | 7/2003 | Churquina | G06Q 40/00 705/35 |
| 2004/0117302 A1* | 6/2004 | Weichert et al. | 705/40 |
| 2006/0217994 A1 | 9/2006 | Gardner et al. | |
| 2007/0075490 A1* | 4/2007 | Gak | A63F 3/00157 273/146 |
| 2008/0082436 A1* | 4/2008 | Shalen | G06Q 40/04 705/36 R |
| 2008/0154827 A1 | 6/2008 | Connors | |
| 2008/0189634 A1 | 8/2008 | Tevanian et al. | |
| 2009/0054127 A1* | 2/2009 | Sweary | G07F 17/3295 463/16 |
| 2009/0076974 A1* | 3/2009 | Berg | G06Q 30/06 705/36 R |
| 2009/0222346 A1* | 9/2009 | Greene | G06Q 10/04 705/14.53 |
| 2010/0144425 A1* | 6/2010 | Dannenberg | G06Q 40/04 463/25 |
| 2011/0065494 A1* | 3/2011 | Kennedy | G07F 17/32 463/25 |
| 2011/0137848 A1* | 6/2011 | Stephens, Jr. | 706/52 |
| 2013/0103687 A1* | 4/2013 | Kakui | G06F 17/30595 707/736 |

OTHER PUBLICATIONS

Simon et al.: Accuracy Driven Artificial Neural Networks in Stock Market Predition, May 2012, International Journal on Soft Computing (IJSC), vol. 3, No. 2, pp. 35-44. (Year: 2012).*

Beer Industry Electronic Commerce Coalition (BIECC): Hitting the Mark: Accuracy in Beer Sales Forecasting, 2009, pp. 1-10. (Year: 2009).*

Chen et al.: Designing Markets for Prediction, 2010, AI Magazine, pp. 42-52. (Year: 2010).*

INTRADE: How does INTRADE work? May 15, 2011, Web Archives, pp. 1-4. (Year: 2011).*

Mark T. Bradshaw et al, Do Sell-Side Analysts Exhibit Differential Target Price Forecasting Ability?, Mar. 2007, retrieved from http://papers.ssrn.com/sol3/papers.cfm?abstract_id=698581.

http://predictwallstreet.com/people.aspx.

* cited by examiner

SYSTEM, METHOD, AND APPARATUS FOR PROVIDING A PREDICTION-BASED MARKETPLACE

PRIORITY CLAIM

This application claims the benefit of U.S. Provisional Application No. 61/639,996, filed on Apr. 30, 2012, which is hereby incorporated by reference.

FIELD OF THE INVENTION

The present invention is generally related to prediction-based marketplaces. For example, an embodiment of the present invention is related to a prediction-based marketplace for financial instruments.

BACKGROUND

Provided is a prediction-based marketplace. While some existing prediction-based marketplaces may be adequate in some respects, there may be alternative prediction-based marketplaces that are advantageous in other respects. The present disclosure, for example, may provide a prediction-based marketplace where buyers (e.g., consumers) may purchase (e.g., for monetary payment or another type of consideration) a prediction for the outcome of an event.

The present disclosure provides a prediction-based marketplace that may provide pricing or valuation, for the predictions, that may be based on objective information. For example, in one embodiment, a prediction-based marketplace may provide predictions for the prices (e.g., opening, high, low or closing [OHLC] price) of financial instruments. In that scenario, the prediction-based marketplace may provide pricing or valuation of a prediction for that financial instrument based on the historical pricing (e.g., closing or opening prices) of that financial instrument.

Further, the present disclosure provides a prediction-based marketplace that may credit a portion of the purchase price back to the buyer, or consumer, of a prediction. For example, in one embodiment, a prediction-based marketplace may provide the buyer with a portion of the amount that the buyer paid for the prediction of an event outcome (e.g., the OHLC price of a financial instrument) based on the actual outcome of the event (e.g., the actual OHLC price of the financial instrument). In that scenario, the prediction-based marketplace may provide the buyer with a portion of the purchase price for a prediction that may not be entirely accurate. In some instances, the amount of the credit to the buyer may depend on the direction of the prediction. For example, the amount of the credit to the buyer may depend on the direction of the prediction relative to the direction of the actual outcome of the event. Further, the prediction-based marketplace may distribute the purchase price for predictions among the owner or operator of the marketplace (e.g., market maker), the consumers (e.g. buyers), and suppliers (e.g., providers of predictions) in a manner that depends on the actual outcome of the event.

SUMMARY OF THE INVENTION

In one embodiment, included is a website to publish, for example, today's OHLC price forecasts of any tradable financial instrument such as, but not limited to, stocks or bonds. The website may be a secure website.

There may be one or more browser versions offered such as a regular browser version for desktops and laptops, and a mobile browser version for mobile devices, for example, smart phones and tablets. Further, there may be an application that may be offered for computing devices such as desktops and laptops, as well as an application for mobile devices such as smart phones and tablets.

In an embodiment, for any financial instrument, the user can be a predictor, or supplier, (who forecasts, for example, today's OHLC price of a given instrument) and/or a buyer, or consumer, of those predictions.

For example, the predictor's goal is to forecast a daily (e.g., today's) OHLC price for a given instrument within ±P % of the actual OHLC price. P is a variable that may be set, for example, by a market maker that provides the marketplace. Alternatively, P may vary according to other factors. Further, P may be set by other market participants, for example, the consumers and suppliers.

To establish a track record for a given instrument, each predictor may publish free forecasts for that instrument for N number of days; e.g., any buyer can buy forecasts per instrument per predictor for the first N days without any charge.

After these free forecasts, for example, the buyers will pay X amount per forecast per predictor where X is, for example, the maximum between 0.1% (10 basis points) of some base price such as yesterday's closing or today's opening price of the instrument depending on the time of the forecast and some minimum amount M that may depend on the country where the instrument is located; for example, in the United States, M could be one US Dollar where as in India, M could be ten Indian Rupees.

For any instrument, it's possible that a predictor may start with a certain prediction and as the day (or during an alternative time interval for which the forecast was made) progresses, he/she may change it to tune his/her forecast. The buyer may pay for any given prediction once and may not have to pay for the subsequent revisions of that prediction during the day. In alternative embodiments, the buyer may have to pay for a subsequent revision of that prediction during the day (or during an alternative time interval for which the forecast was made).

In each payment of X, the website, (e.g., the market maker, or owner or operator of the website) may keep C % of X.

At the end of the day (or at the end of an alternative time interval for which the forecast was made), if the forecasted price falls within ±P % of the actual OHLC price, the predictor may get the remaining (100 minus C) % of X per forecast. If the forecasted price falls outside of ±P % of actual OHLC price but has "good direction", the predictor may keep G % of X and the buyer may get back (100 minus C minus G) % of X. Good direction, for example, may mean the predicted OHLC price and the actual OHLC price moved in the same direction with respect to some base price such as the opening price for today or the closing price for yesterday depending on when the prediction was made. If the forecasted price falls outside of ±P % of OHLC price and has "bad direction", the predictor may keep B % of X and the buyer may get back (100 minus C minus B) % of X. Bad direction, for example, may mean the predicted OHLC price and the actual OHLC price moved in different directions with respect to some base price such as the closing price for yesterday or the opening price for today depending on when the prediction was made.

In one embodiment, provided is a system and method for implementing a prediction-based marketplace. For example, the system may include one or more processing units operable to: receive a prediction for an outcome of an event from a seller, determine a price to offer the prediction for sale to the buyer, provide the prediction to a buyer, receive an indication by the buyer to purchase the prediction, process a payment from the buyer to purchase the prediction, determine the actual outcome of the event that is predicted, compare the actual and predicted outcomes of the event, and distribute the payment in a manner so that the buyer and seller each receive a portion of the payment based on the comparison of the actual and predicted outcomes.

In another embodiment, provided is a method comprising receiving a prediction for an outcome of an event from a seller, determining a price to offer the prediction for sale to the buyer, providing the prediction to a buyer, receiving an indication by the buyer to purchase the prediction, processing a payment from the buyer to purchase the prediction, determining the actual outcome of the event that is predicted, comparing the actual and predicted outcomes of the event, and distributing the payment in a manner so that the buyer and seller each receive a portion of the payment based on the comparison of the actual and predicted outcomes.

In yet another embodiment, provided is an apparatus comprising one or more computer-readable storage structures for storing a plurality of computer instructions executable by a processor, the plurality of computer instructions including: instructions for receiving a prediction for an outcome of an event from a seller, instructions for determining a price to offer the prediction for sale to the buyer, instructions for providing the prediction to a buyer, instructions for receiving an indication by the buyer to purchase the prediction, instructions for processing a payment from the buyer to purchase the prediction, instructions for determining the actual outcome of the event that is predicted, instructions for comparing the actual and predicted outcomes of the event, and instructions for distributing the payment in a manner so that the buyer and seller each receive a portion of the payment based on the comparison of the actual and predicted outcomes.

DETAILED DESCRIPTION OF THE PREFERRED EMBODIMENTS

Figure 1:
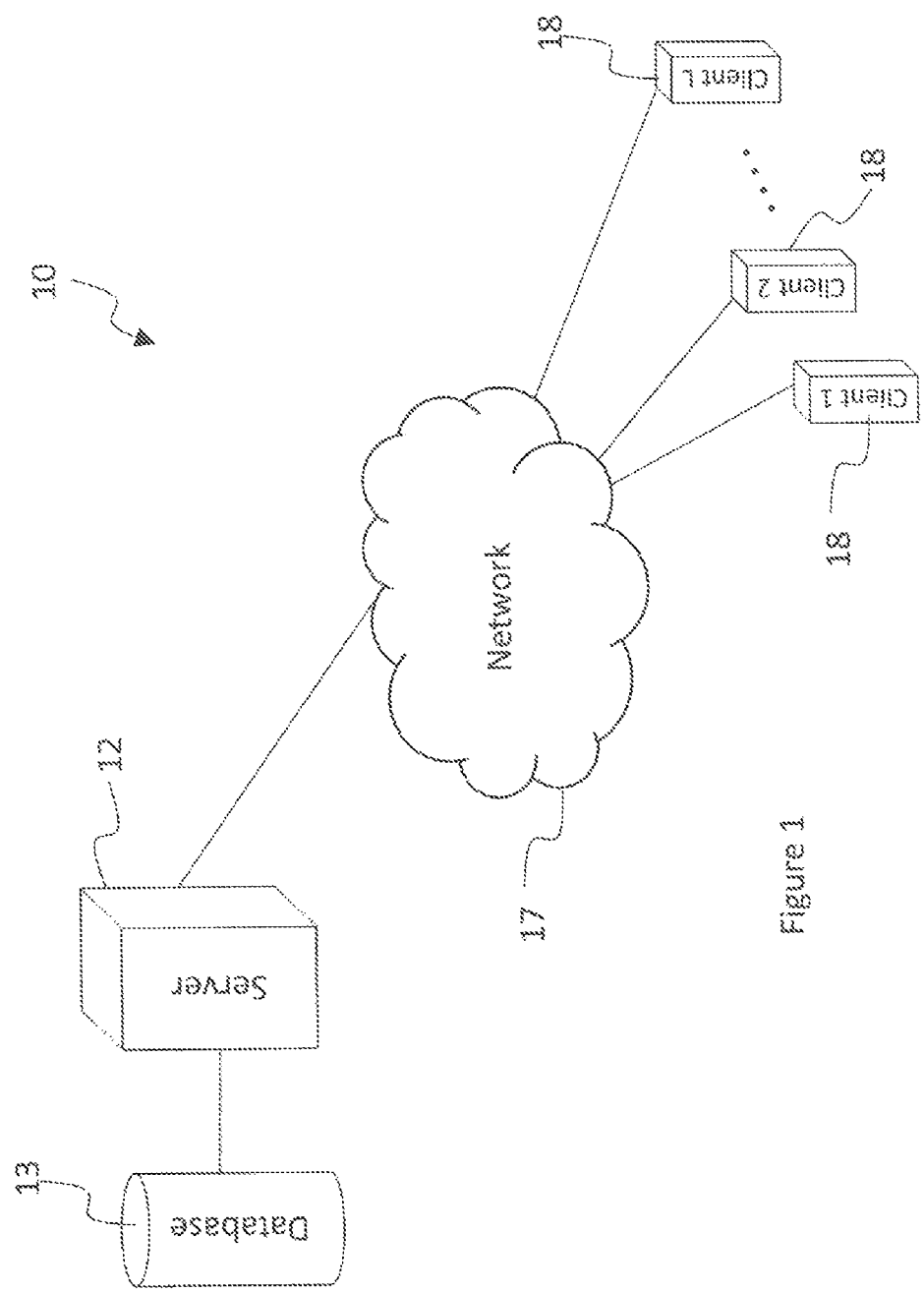
FIG. 1 is a diagrammatic representation of a system in which an embodiment of the present invention may be implemented.

FIG. 1 is a diagrammatic representation of a system 10 in which an embodiment of the present invention may be implemented. System 10 includes a server 12 that is in communication with a database 13. The server 12 is also in communication with a network 17. In some embodiments the network 17 may include the internet. In alternative embodiments, the network may include a wide-area-network (WAN). In further embodiments, the network may include a local-area-network (LAN). In other embodiments, the network may be a different type of network. The system 10 further includes a plurality of clients 18 that may include clients 1, 2, . . . , L, where L may be an arbitrary number of clients. The plurality of clients 18, for example, may include computing devices. In one embodiment, one or more of the clients 1, 2, . . . , L of the plurality of clients 18 may include a desktop computer. Further, in an embodiment, one or more of the clients 1, 2, . . . , L of the plurality of clients 18 may include a server. In an alternative embodiment, the plurality of clients 18 may include a mobile computing device such as a mobile phone or tablet, or any other mobile computing device. The plurality of clients 18 may be in communication with the network 17. The plurality of clients 18 and server 12 may communicate through the network 17. The server 12 may provide an application, such as a web-based application, that may allow the client 18 to interact with the server 12 and database 13. Further, in some embodiments one or more of the clients 1, 2, . . . , L of the plurality of clients 18 may use a browser to interact with the server 12. In some embodiments, one or more of the clients 1, 2, . . . , L of the plurality of clients 18 may use an application to interact with the server 12.

In further embodiments, the server 12 and database 13 may communicate securely. Further, one or more of the server 12 and database 13 may communicate securely with one or more of the clients 1, 2, . . . , L of the plurality of clients 18. For example, in one instance the system 10 may include secure network infrastructure. For example, the system 10 may include a firewall or other type of secure network infrastructure. In an alternative embodiment, the system 10 may include secure features such as encryption and decryption schemes to provide security, over a medium that may or may not already be secure. Further, secure features may be distributed.

In addition, the system 10 of FIG. 1 may reside within or may be operated by an organization and/or one or more of its affiliates. For example, the system 10 may reside within or may be operated by an organization and/or one or more of its affiliates that may be associated with, for example, the financial services industry. In this scenario, the server 12, database 13, and plurality of clients 18 may reside within the organization and/or one or more of its affiliates or may be operated by the organization and/or one or more of its affiliates. The network 17 may be a network that is operated by the organization and/or one or more of its affiliates, for example, an intranet, WAN, LAN, or other type of network. On the other hand, the system 10 of FIG. 1 may be distributed across several organizations or entities. Further, server 12, database 13, and plurality of clients 18 may be controlled or operated by different organizations or entities.

Figure 2:
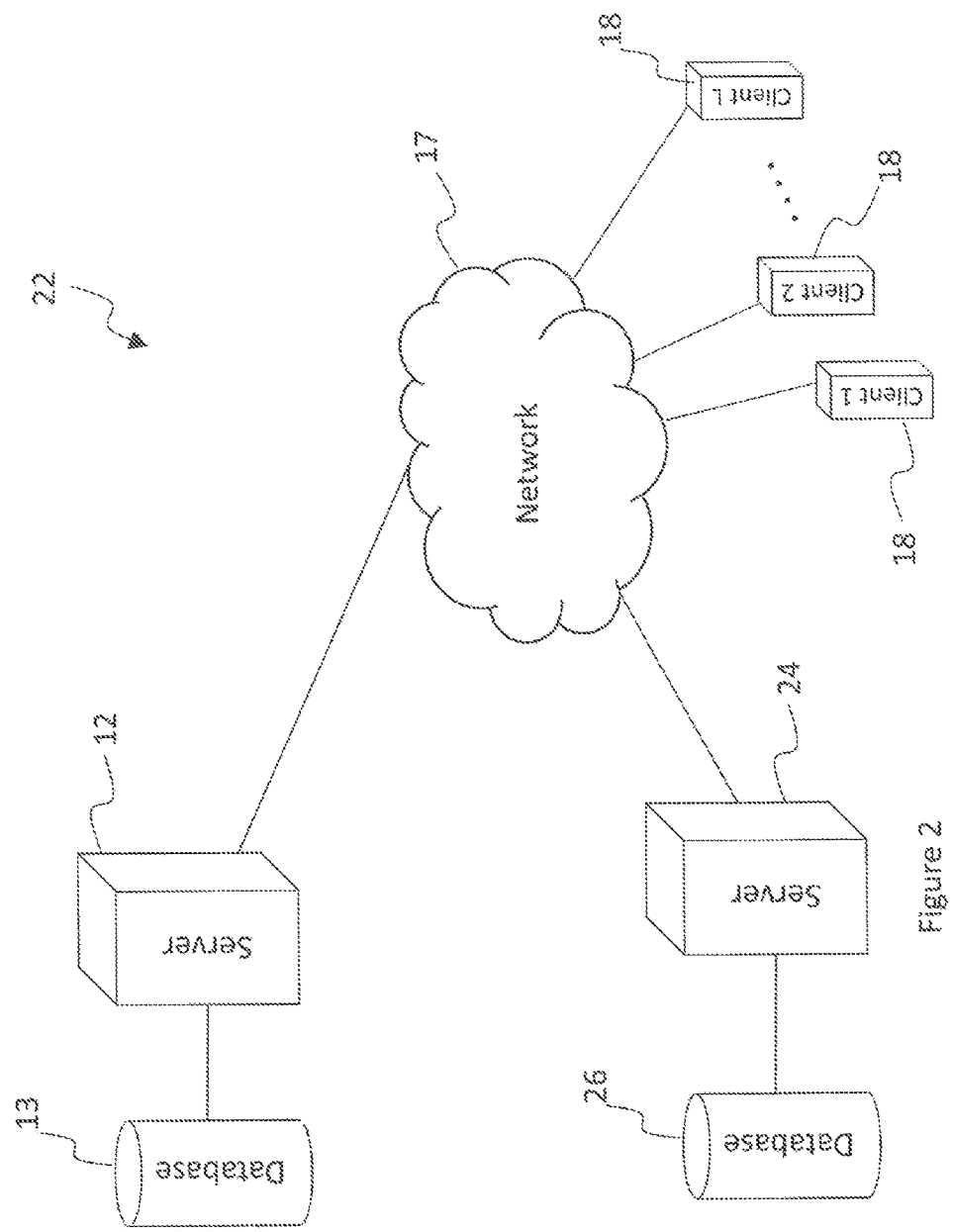
FIG. 2 is a diagrammatic representation of another system in which an embodiment of the present invention may be implemented.

FIG. 2 is a diagrammatic representation of another system 22 in which an embodiment of the present invention may be implemented. System 22 is similar to system 10 of FIG. 1. Common reference numerals are used to describe similar components. For sake of simplicity, the discussion of FIG. 2 focuses on the differences. System 22 includes another server 24. Server 24 may be in communication with the network 17. Further, system 22 includes another database 26. The database 26 may be in communication with the server 24. The server and database pair 24, 26 may be in communication with the server 12 through the network 17. The server 12 may communicate with the server 24 and database 26 to receive information related to events. For example, in one embodiment the database 26 stores information relating to financial instruments. In alternative embodiments, the database 26 stores information relating to other events. Further, in some embodiments one or more of the clients 1, 2, . . . , L of the plurality of clients 18 may use a browser to interact with the server 24. In other embodiments, one or more of the clients 1, 2, . . . , L of the plurality of clients 18 may use an application to interact with the server 24.

In further embodiments, one or more of the servers 12, 24 and databases 13, 26 may communicate securely. Further, one or more of the servers 12, 24 and databases 13, 26 may communicate securely with one or more of the clients 1, 2, . . . , L of the plurality of clients 18. For example, in one instance the system 10 may include secure features such as secure network infrastructure. For example, the system 10 may include a firewall or other type of secure network infrastructure. In an alternative embodiment, the system 10 may include other secure features such as encryption and decryption schemes to provide security, over a medium that may or may not already be secure. Further, secure features may be distributed.

In addition, the system 22 of FIG. 2 may reside within or may be operated by an organization and/or one or more of its affiliates. For example, the system 22 may reside within or may be operated by an organization and/or one or more of its affiliates that may be associated with, for example, the financial services industry. In this scenario, the servers 12, 24, the databases 13, 26, and plurality of clients 18 may reside within the organization and/or one or more of its affiliates or may be operated by the organization and/or one or more of its affiliates. The network 17 may be a network that is operated by the organization and/or one or more of its affiliates, for example, an intranet, WAN, LAN, or other type of network. On the other hand, the system 22 of FIG. 2 may be distributed across several organizations or entities. Further, the servers 12, 24, the databases 13, 26, and the plurality of clients 18 may be controlled or operated by different organizations or entities.

Figure 3:
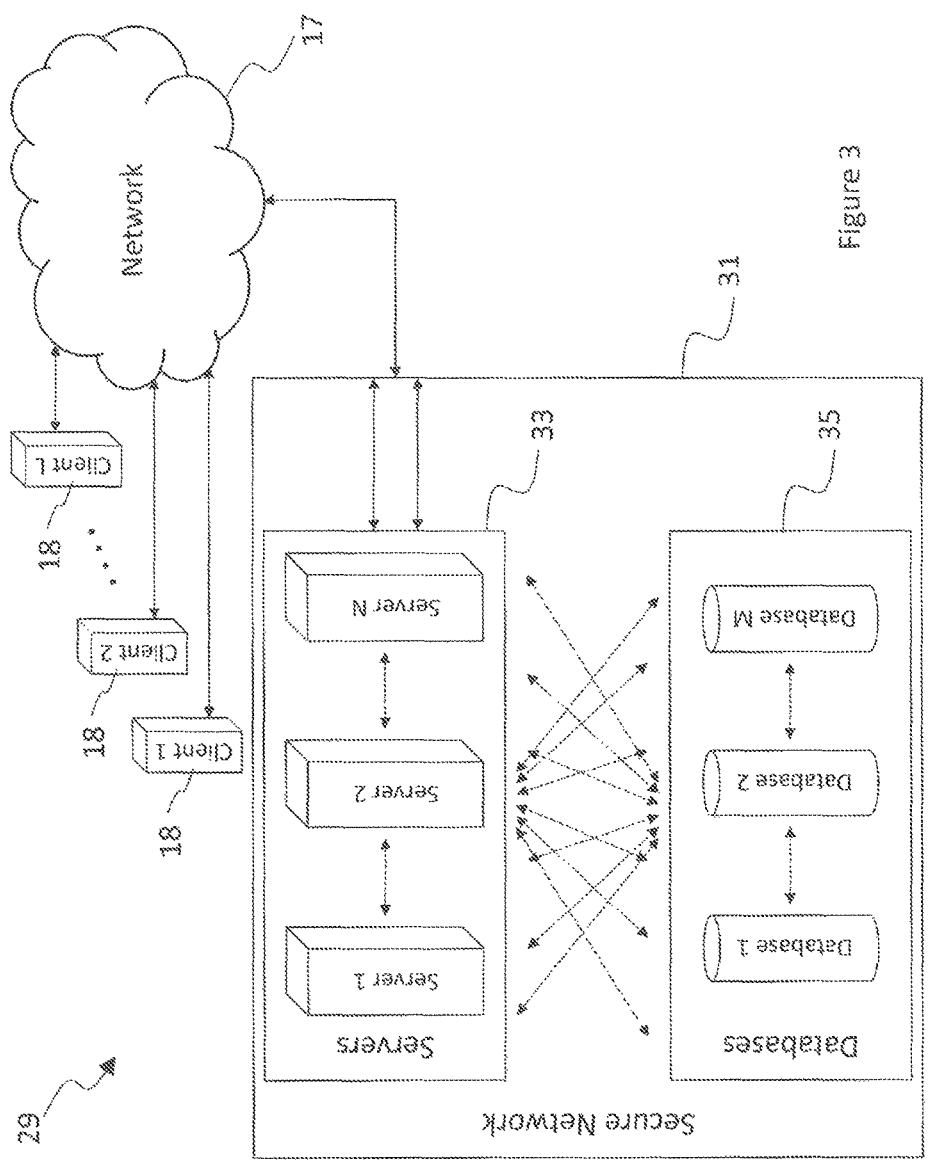
FIG. 3 is a diagrammatic representation of yet another system in which an embodiment of the present invention may be implemented.

FIG. 3 is a diagrammatic representation of yet another system 29 in which an embodiment of the present invention may be implemented. System 29 is similar to systems 10 and 22 of FIGS. 1 and 2, respectively. Common reference numerals are used to describe similar components. For sake of simplicity, the discussion of FIG. 3 focuses on the differences. As compared to the systems 10 (FIG. 1) and 22 (FIG. 2), the system 29 includes a plurality of processing units. Further, the plurality of processing units may be distributed. For example, the system 29 may include a secure network 31 that may be in communication with the network 17. The secure network may include a plurality of servers 33 and a plurality of databases 35. The plurality of servers 33 and databases 35 may be distributed. For example, the plurality of servers 33 and databases may be distributed geographically. Further, for example, the plurality of servers 33 and databases 35 may be distributed in terms of computational and storage capacity, respectively. Moreover, the servers 33 and databases 35 may be distributed in yet other ways. The system 29 further includes a plurality of clients 18 that may include clients 1, 2, . . . , L, where L may be an arbitrary number of clients. The plurality of clients 18 may be in communication with the network 17. Further, the plurality of clients 18 may be in communication with the secure network 31. The plurality of clients 18 may communicate with the plurality of severs 33 and the plurality of databases 35. For example, in an embodiment, the plurality of servers 33 may provide an application, such as a web-based application, that may allow any one or more of the clients 1, 2, . . . , L of the plurality of clients 18 to individually interact with any one or more of the servers and databases of the plurality of servers and databases 33 and 35.

In further embodiments, the secure network 31 may be one secure network. In alternative embodiments, the secure network 31 may include a plurality of secure networks that may include one or more servers of the plurality of servers 33 and one or more databases of the plurality of databases 35. In some embodiments, the one or more secure networks may be distributed. For example, one or more secure networks may be distributed geographically. Moreover, for example, a plurality of secure networks may be in the same location, or one or more of the plurality of secure networks may be in different locations. Further, for example, one or more secure networks may be distributed in terms of bandwidth, computational and storage capacity.

Moreover, the secure network 31 may include secure network infrastructure. For example, the secure network 31 may include a firewall or other type of secure network infrastructure. Alternatively, the secure network may include secure features such as encryption and decryption schemes to provide security, over a medium that may or may not already be secure. For example, the secure network 31 may use encryption and decryption to provide security between one or more of the plurality of clients 26, plurality of servers 33, and plurality of databases 35.

In addition, the system 29 of FIG. 3 may reside within or may be operated by an organization and/or one or more of its affiliates. For example, the system 29 may reside within or may be operated by an organization and/or one or more of its affiliates that may be associated with, for example, the financial services industry. In this scenario, the plurality of servers 33, the plurality of databases 35, and the plurality of clients 18 may reside within the organization and/or one or more of its affiliates or may be operated by the organization and/or one or more of its affiliates. The network 17 may be a network that is operated by the organization and/or one or more of its affiliates, for example, an intranet, WAN, LAN, or other type of network. On the other hand, the system 29 of FIG. 3 may be distributed across several organizations or entities. Further, the plurality of servers 33, the plurality of databases 35, and the plurality of clients 18 may be controlled or operated by different organizations or entities.

Figure 4:
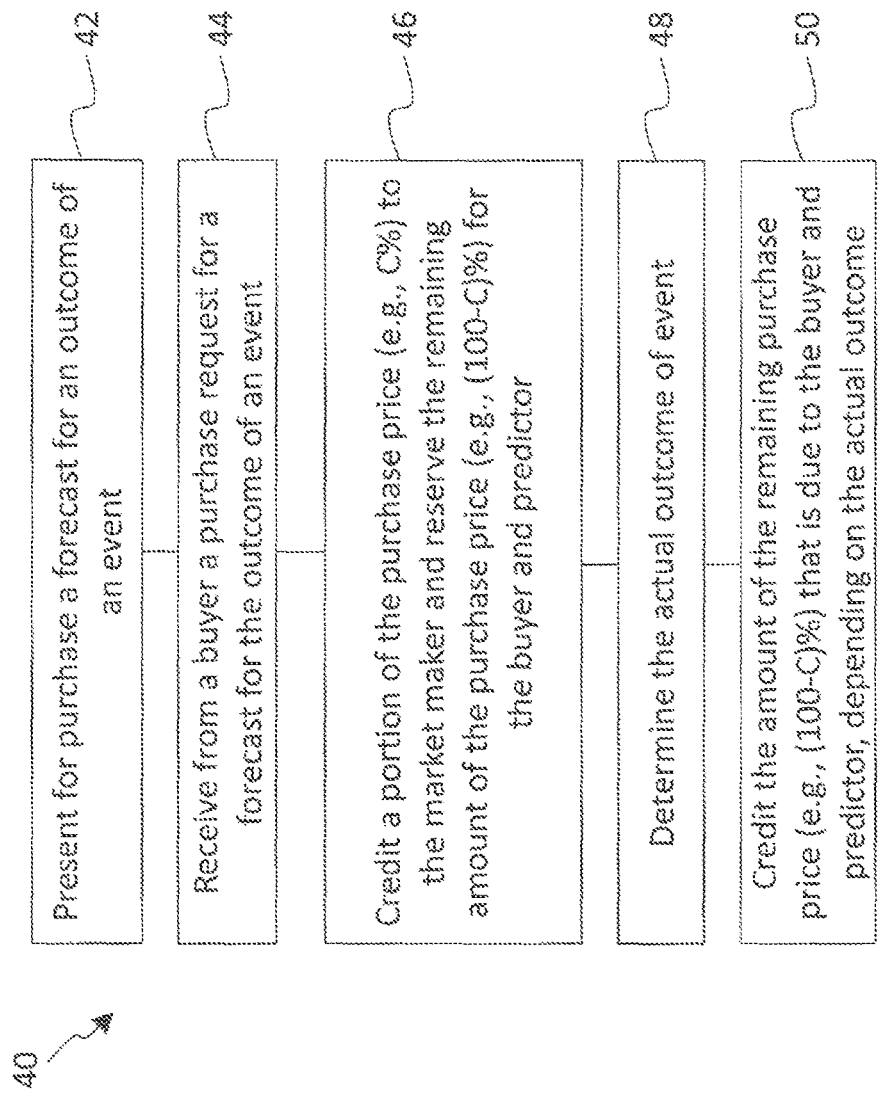
FIG. 4 is a flowchart of an embodiment of a method for providing a prediction-based marketplace.

FIG. 4 is a flowchart of an embodiment of a method 40 for providing a prediction-based marketplace. The provider of the prediction-based marketplace may be, for example, a market maker. In an embodiment, the method 40 begins at block 42 to present for purchase a forecast for an outcome of an event. The method 40 then proceeds to block 44 to receive from a buyer a purchase request for a forecast for the outcome of an event. The method 40 then advances from block 44 to block 46 where the method 40 credits a portion of the purchase price, for example a defined percentage of the purchase price (e.g., C %), to the market maker and reserve the remaining amount of the purchase price (e.g., (100−C) %) for the buyer and predictor. The defined percentage of the purchase price (e.g., C %) may be determined, for example, by the market maker. In alternative embodiments, the defined percentage of the purchase price (e.g., C %) may be determined by a consumer or buyer of the forecast. In yet another embodiment, the defined percentage of the purchase price (e.g., C %) may be determined by a predictor of the forecast. In further embodiments, the defined percentage of the purchase price (e.g., C %) may be determined by a combination of the market maker, the consumer or buyer, and the predictor. In some embodiments, the defined percentage of the purchase price (e.g., C %) may be determined in other ways.

In alternative embodiments, as will be discussed below with respect to FIGS. 10-12, a method for providing a prediction-based marketplace may credit the market maker in a different sequence. From block 46, the method 40 then continues to block 48 and determines the actual outcome of the forecasted event. Further, the method 40 proceeds to block 50 and credits the amount of the remaining purchase price (e.g., (100−C) %) that is due to the buyer and predictor, depending on the actual outcome of the forecasted event.

Figure 5:
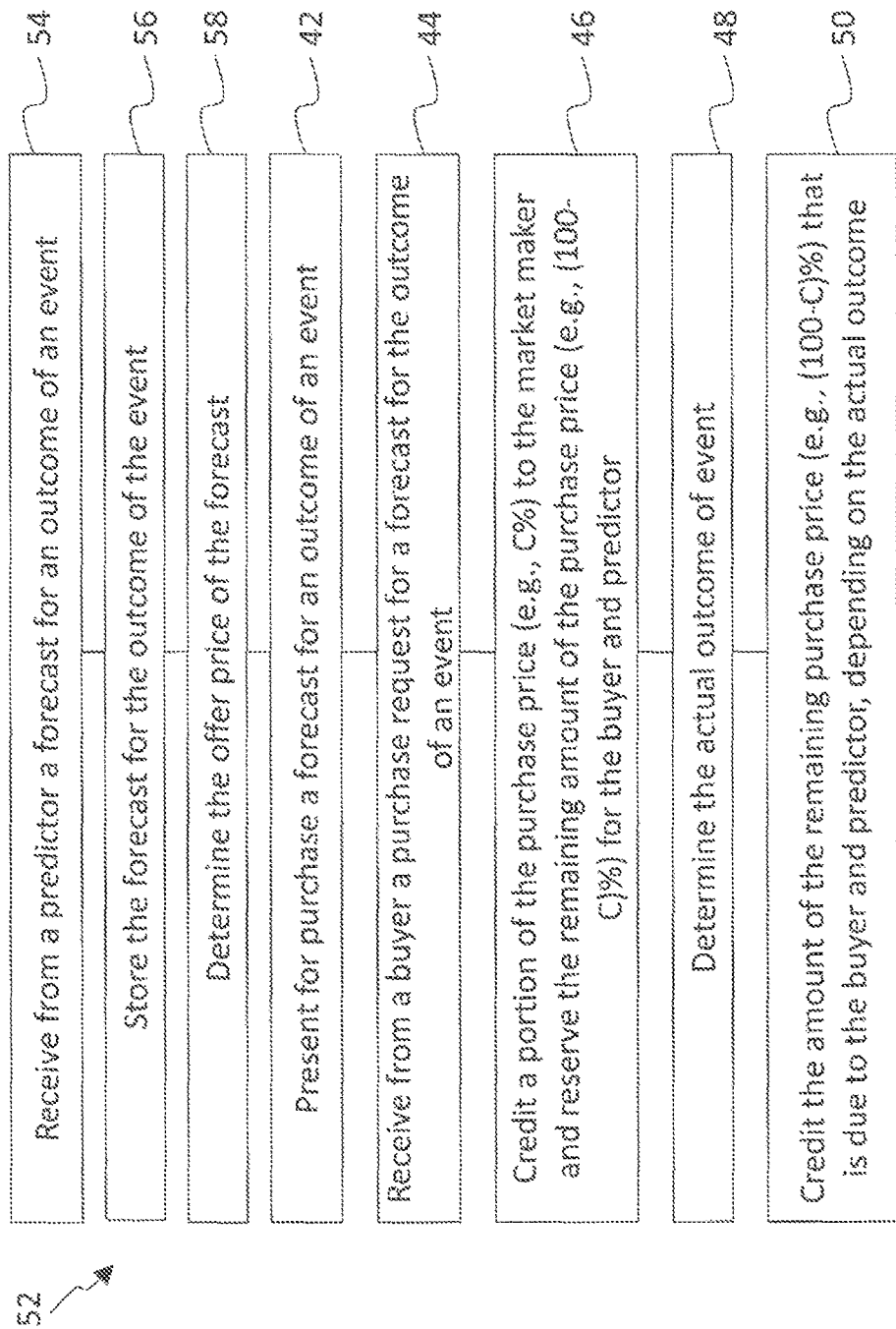
FIG. 5 is a flowchart of an alternative embodiment of a method for providing a prediction-based marketplace.

FIG. 5 is a flowchart of an alternative embodiment of a method 52 for providing a prediction-based marketplace. The method 52 is similar to the method 40 of FIG. 4. Common reference numerals are used to describe similar blocks of the methods. For sake of simplicity, the discussion of FIG. 5 focuses on the differences. In an embodiment, the method 52 first begins at block 54 (instead of block 42 of FIG. 4) and receives from a predictor a forecast for an outcome of an event. The method 52 then proceeds to block 56 and stores the forecast for the outcome of the event. The method 52 then continues to block 58 and determines the offer price of the forecast. After block 58, the method goes on to blocks 42-50 as described above with respect to FIG. 4.

Figure 6:
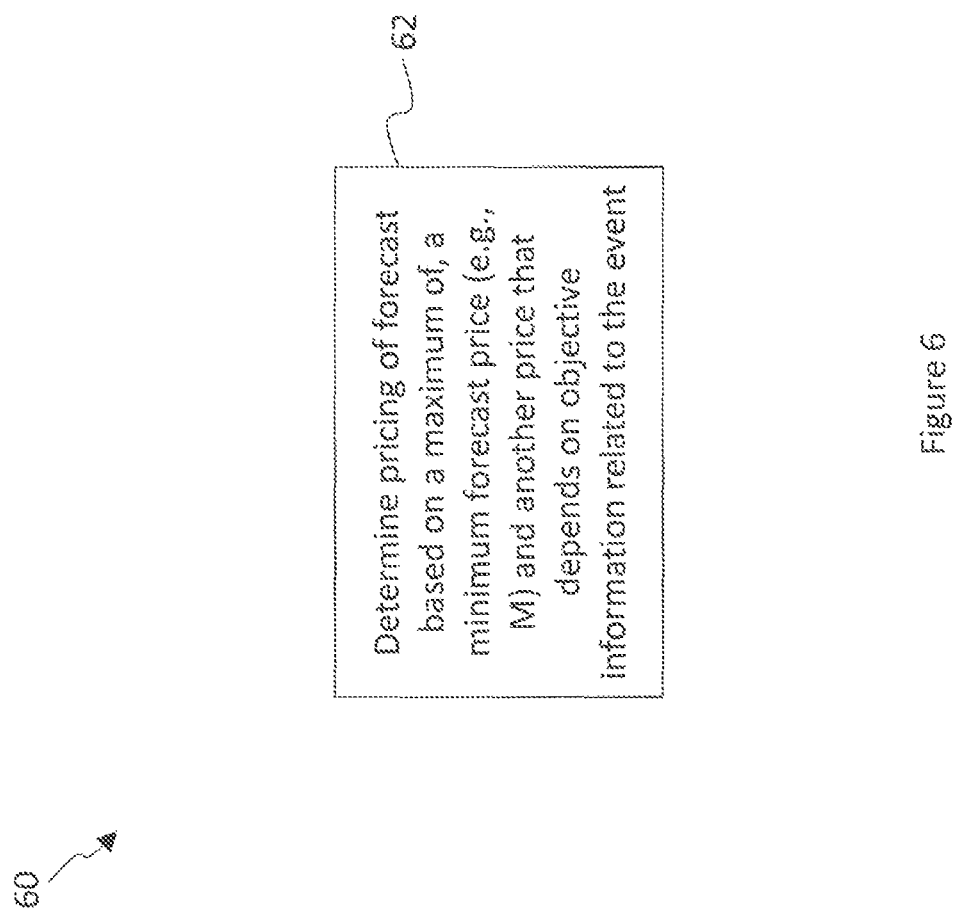
FIG. 6 is a flowchart of an embodiment of a method for pricing a prediction.

FIG. 6 is a flowchart of an embodiment of a method 60 for pricing a prediction. For example, pricing of a prediction may be based on objective information related to a forecasted event. In an embodiment, the method 60 includes block 62 and determines pricing of the forecast based on a maximum of, a minimum forecast price (e.g., M) and another price that depends on objective information relating to the event. The minimum forecast price is a price that may be determined, for example, by the market maker. In alternative embodiments, the minimum forecast price may be determined by a consumer or buyer of the forecast. In yet another embodiment, the minimum forecast price may be determined by a predictor of the forecast. In further embodiments, the minimum forecast price may be determined by a combination of the market maker, the consumer or buyer, and the predictor. In some embodiments, the minimum forecast price may be determined in other ways. Moreover, the objective information relating to the event may include historical data related to the event. In the alternative embodiments, the objective information may include other information related to the event.

Figure 7:
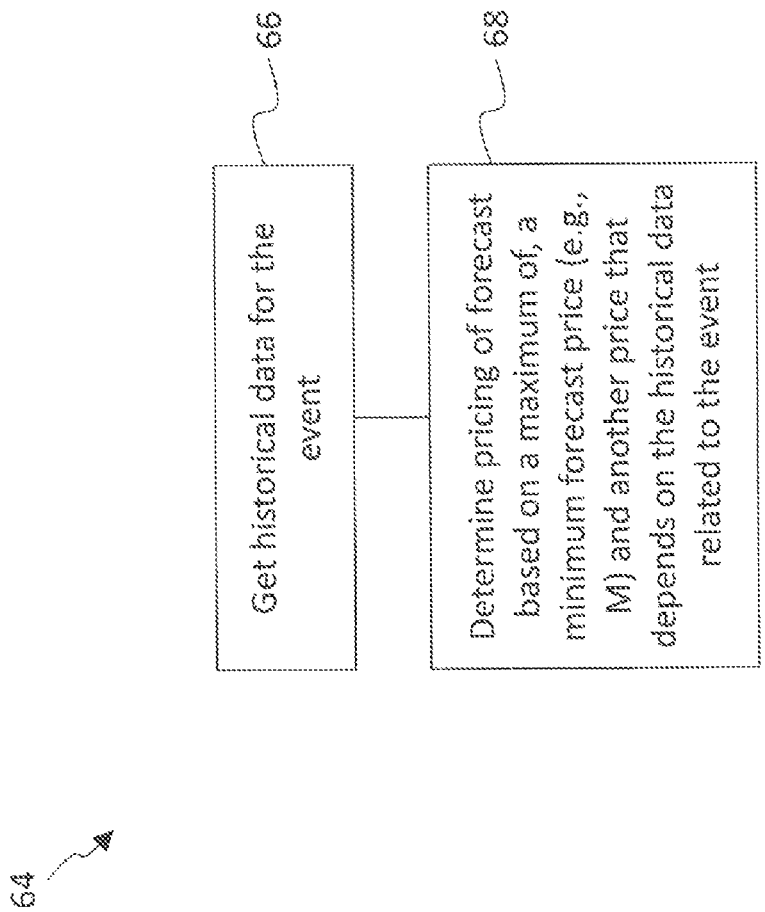
FIG. 7 is a flowchart of an alternative embodiment of a method for pricing a prediction.

FIG. 7 is a flowchart of an embodiment of a method 64 for pricing a prediction. For example, pricing of a prediction may be based on historical data related to a forecasted event. In an embodiment, the method 64 begins at block 66 and receives or gets the historical data for the event. Then the method 66 continues to block 68 and determines pricing of the forecast based on a maximum of, a minimum forecast price (e.g., M) and another price that depends on objective information relating to the event. The minimum forecast price is a price that may be determined, for example, by the market maker. In alternative embodiments, the minimum forecast price may be determined by a consumer or buyer of the forecast. In yet another embodiment, the minimum forecast price may be determined by a predictor of the forecast. In further embodiments, the minimum forecast price may be determined by a combination of the market maker, the consumer or buyer, and the predictor. In some embodiments, the minimum forecast price may be determined in other ways.

Figure 8:
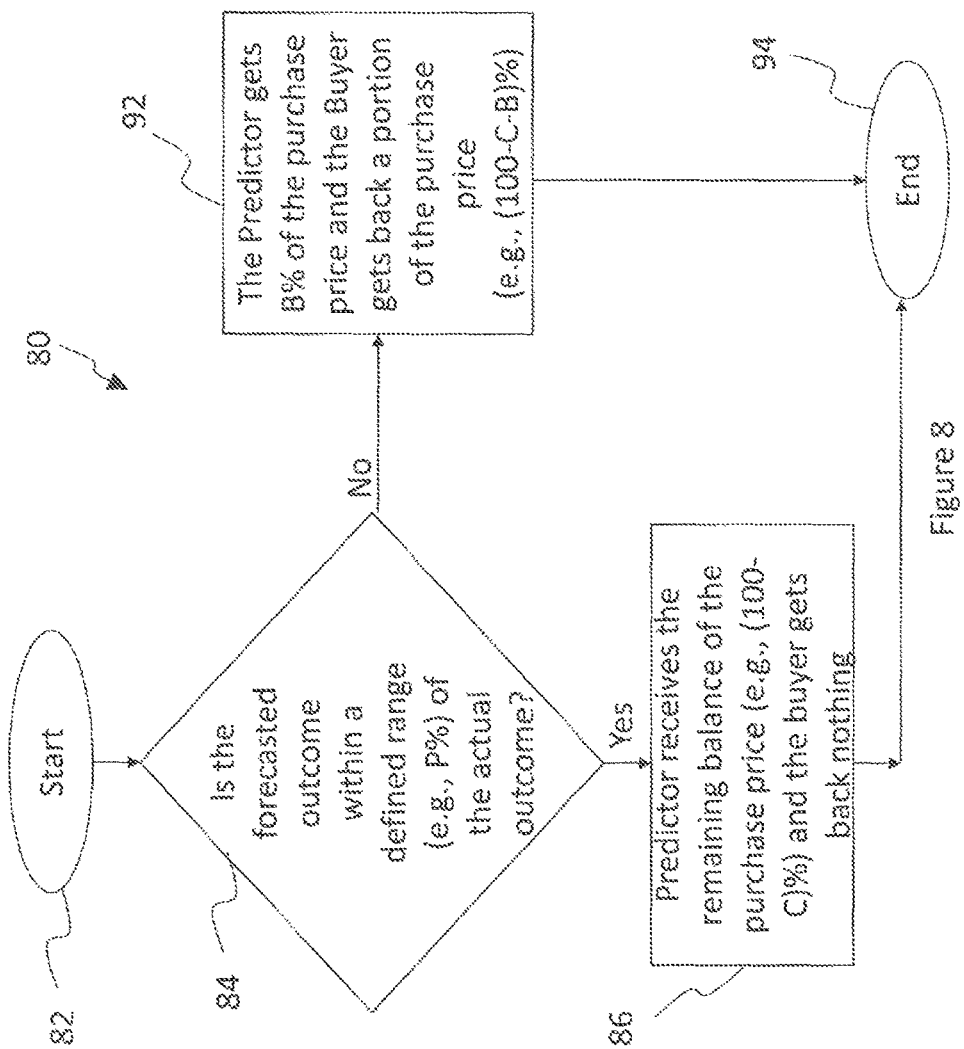
FIG. 8 is a flowchart of an embodiment of a method for distributing a purchase price to a buyer and predictor.

FIG. 8 is a flowchart of an embodiment of a method 80 for distributing a purchase price to a buyer and predictor. The method 80 starts at block 82. From block 82 the method continues to block 84 where the method 80 determines whether the forecasted outcome is within a defined range (e.g., ±P %) of the actual outcome. The defined range (e.g., ±P %) may be determined, for example, by the market maker. In alternative embodiments, the defined range (e.g., ±P %) may be determined by a consumer or buyer of the forecast. In yet another embodiment, the defined range (e.g., ±P %) may be determined by a predictor of the forecast. In further embodiments, the defined range (e.g., ±P %) may be determined by a combination of the market maker, the consumer or buyer, and the predictor. In some embodiments, the defined range (e.g., ±P %) may be determined in other ways.

At block 84, if the method 80 determines that the forecasted outcome is within a defined range (e.g., ±P %) of the actual outcome, the method 80 then proceeds from block 84 to block 86. At block 86, the predictor receives the remaining balance of the purchase price (e.g., (100−C) %) and the buyer gets back nothing. Then the method 80 continues to block 94 where the method 80 ends. On the other hand, if at block 84 the method 80 determines that the forecasted outcome is outside the defined range (e.g., ±P %) of the actual outcome, the method 80 then proceeds from block 84 to block 92. At block 92, the predictor gets B % of the purchase price and the Buyer gets back a portion of the purchase price (e.g., (100−C−B) %). Then the method 80 continues to block 94 where the method 80 ends.

The values C and B may be a defined percentage of the purchase price (e.g., C % and B %) and one or both may be determined, for example, by the market maker. In alternative embodiments, one or both of the defined percentages of the purchase price (e.g., C % and B %) may be determined by a consumer or buyer of the forecast. In yet another embodiment, one or both of the defined percentage of the purchase price (e.g., C % and B %) may be determined by a predictor of the forecast. In further embodiments, one or both of the defined percentage of the purchase price (e.g., C % and B %) may be determined by a combination of the market maker, the consumer or buyer, and the predictor. In some embodiments, one or both of the defined percentage of the purchase price (e.g., C % and B %) may be determined in other ways.

Figure 9:
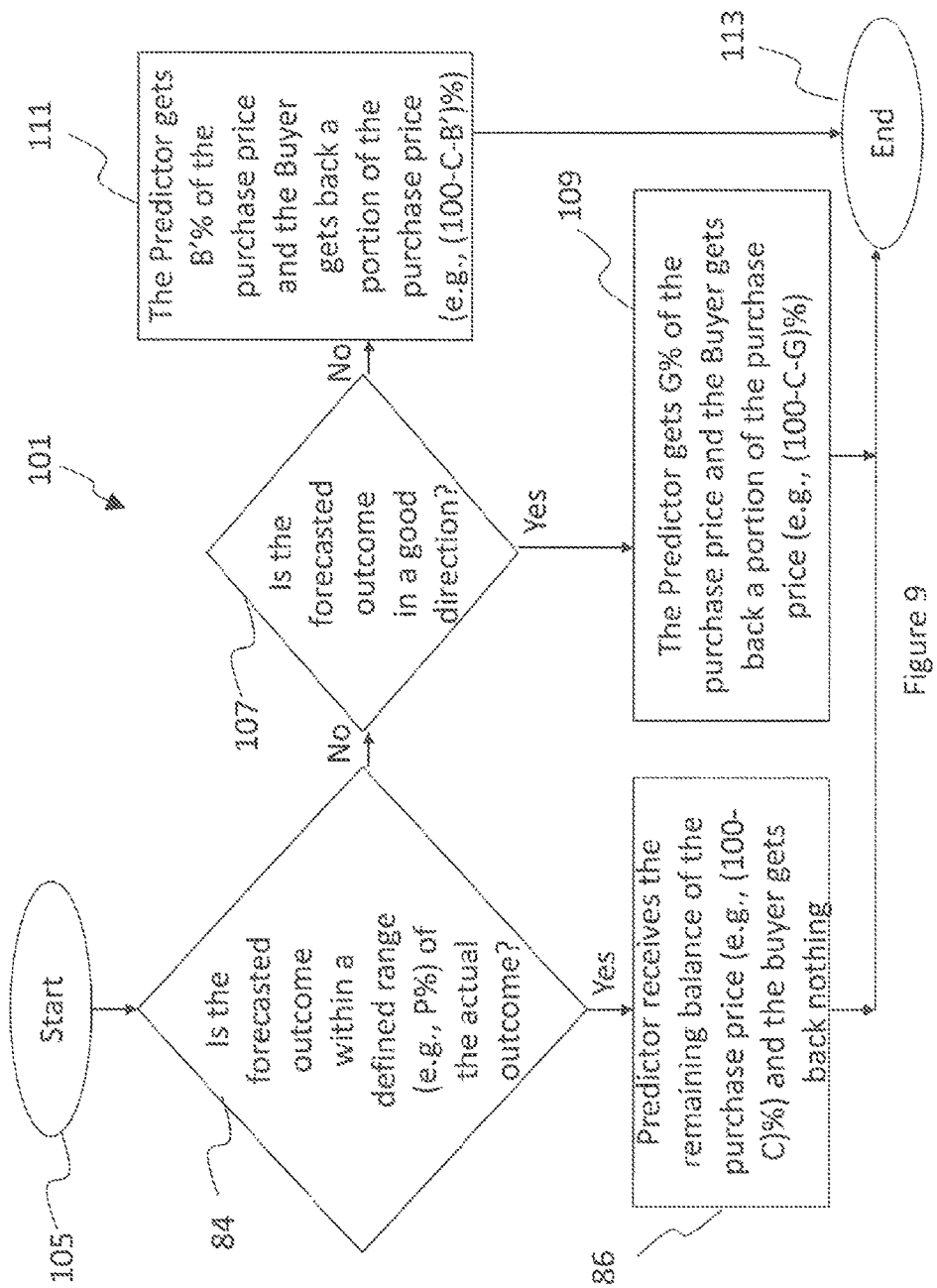
FIG. 9 is a flowchart of an alternative embodiment of a method for distributing a purchase price to a buyer and predictor.

FIG. 9 is a flowchart of an alternative embodiment of a method 101 for distributing a purchase price to a buyer and predictor. The method 101 is similar to the method 80 of FIG. 8. Common reference numerals are used to describe similar blocks. For sake of simplicity, the discussion of FIG. 9 focuses on the differences. The method 101 starts at block 105 and then proceeds to block 84. If at block 84 the method 101 determines that the forecasted outcome is within a defined range (e.g., ±P %) of the actual outcome, then the method proceeds to block 86, as discussed above. After block 86, the method ends at block 113. On the other hand, if at block 84 the method 101 determines that the forecasted outcome is outside the defined range (e.g., ±P %) of the actual outcome, then the method proceeds to block 107. At block 107, the method 101 determines whether the forecasted outcome is in a good direction. If at block 107, the method 101 determines that the forecasted outcome is in a good direction, then the method 101 proceeds to block 109 where the predictor gets, for example, a defined percentage (e.g., G %) of the purchase price and the buyer gets back a portion of the purchase price (e.g., (100−C−G) %). From block 109 the method continues to the end at block 113.

The defined percentage of the purchase price, (e.g., G %), may be determined, for example, by the market maker. In alternative embodiments, the defined percentage of the purchase price, (e.g., G %) may be determined by a consumer or buyer of the forecast. In yet another embodiment, the defined percentage of the purchase price, (e.g., G %) may be determined by a predictor of the forecast. In further embodiments, the defined percentage of the purchase price, (e.g., G %) may be determined by a combination of the market maker, the consumer or buyer, and the predictor. In some embodiments, the defined percentage of the purchase price, (e.g., G %) may be determined in other ways.

On the other hand, if at block 107, the method 101 determines that the forecasted outcome is in a bad direction, then the method 101 proceeds to block 111 where the predictor gets, for example, a defined percentage (e.g., B'%) of the purchase price and the buyer gets back a portion of the purchase price (e.g., (100−C−B') %). From block 111, the method 101 continues to the end at block 113.

The defined percentage of the purchase price, (e.g., B'%), may be determined, for example, by the market maker. In alternative embodiments, the defined percentage of the purchase price, (e.g., B'%) may be determined by a consumer or buyer of the forecast. In yet another embodiment, the defined percentage of the purchase price, (e.g., B'%) may be determined by a predictor of the forecast. In further embodiments, the defined percentage of the purchase price, (e.g., B'%) may be determined by a combination of the market maker, the consumer or buyer, and the predictor. In some embodiments, the defined percentage of the purchase price, (e.g., B'%) may be determined in other ways.

Figure 10:
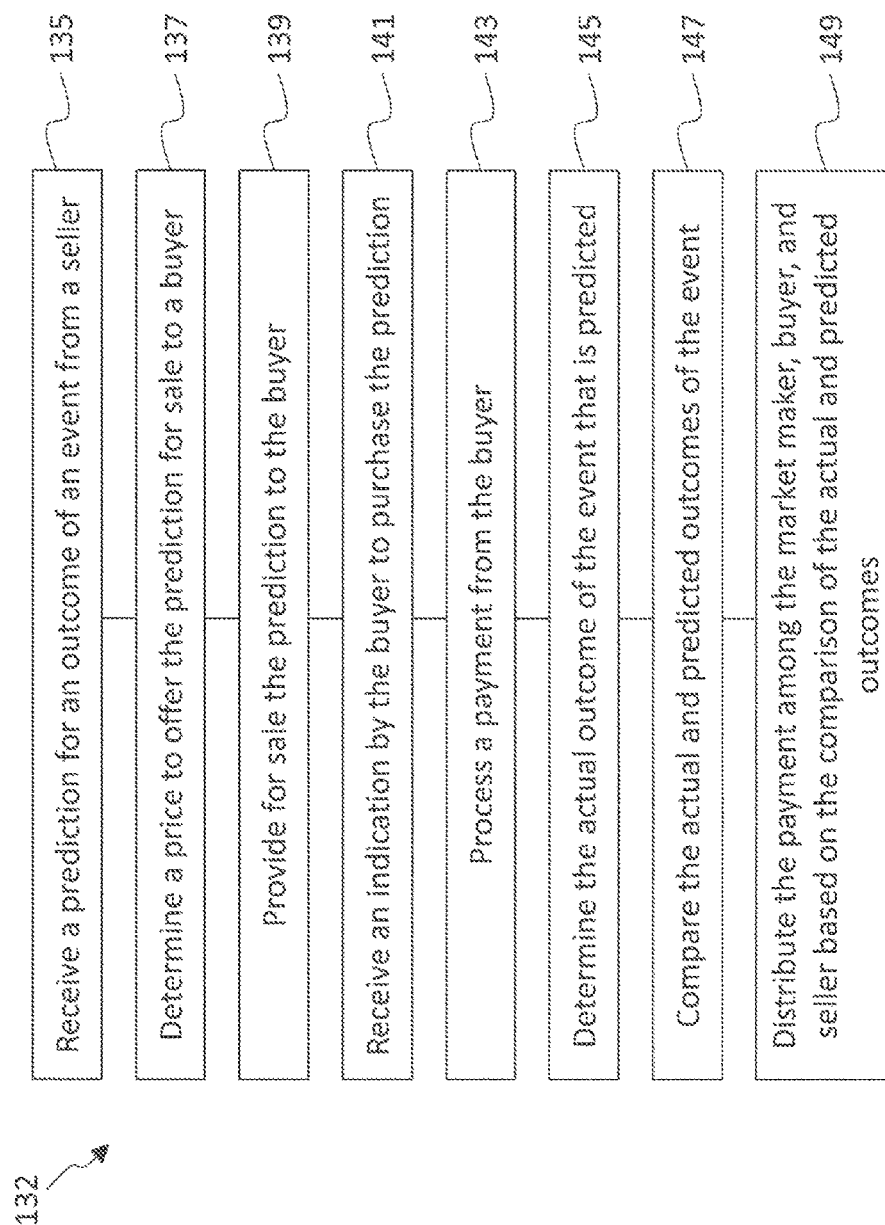
FIG. 10 is a flowchart of an alternative embodiment of a method for providing a prediction-based marketplace.

FIG. 10 is a flowchart of an alternative embodiment of a method 132 for providing a prediction-based marketplace. The method 132 begins at block 135 and receives a prediction for an outcome of an event from a seller. In some embodiments, the prediction is received from a predictor or third party that is different from the market maker. In other embodiments, the market maker may provide predictions of its own. In that scenario, the method 132 at block 135 may receive a prediction for an outcome of an event from a seller that includes the market maker. The method 132 continues from block 135 to block 137. At block 137 the method determines a price to offer the prediction for sale to a buyer. Then the method proceeds to block 139 and provides for sale the prediction to the buyer. From block 139 the method continues to block 141 where the method 132 receives an indication by the buyer to purchase the prediction. In some embodiments, the indication by the buyer to purchase the prediction includes a promise or guarantee that the buyer will pay for the purchase price of the prediction at a later time. For example, while the buyer may indicate their interest to purchase the prediction, their payment may be processed after the outcome and amount owed is determined. In some embodiments, the indication by the buyer to purchase the prediction includes payment for the prediction.

The method 132 proceeds from block 141 to block 143. At block 143, the method 132 processes a payment from the buyer. In some embodiments, such as when the indication by the buyer to purchase the prediction includes a promise or guarantee that the buyer will pay for the purchase price of the prediction at a later time, the method 132 processes the payment associated with this indication. For example, in some embodiments, the method 132 debits an account of the buyer by the amount of the purchase price for the prediction that the buyer has indicated their interest to purchase. In other embodiments, such as when the indication by the buyer to purchase the prediction includes payment for the prediction, the method 132 processes the payment.

From block 143, the method 132 continues to block 145 and determines the actual outcome of the event that is predicted. After that, the method 132 proceeds to block 147. At block 147, the method 132 compares the actual and predicted outcomes of the event. Then the method 132 goes on to block 149 and distribute the payment among the market maker, buyer, and seller based on the comparison of the actual and predicted outcomes.

Figure 11:
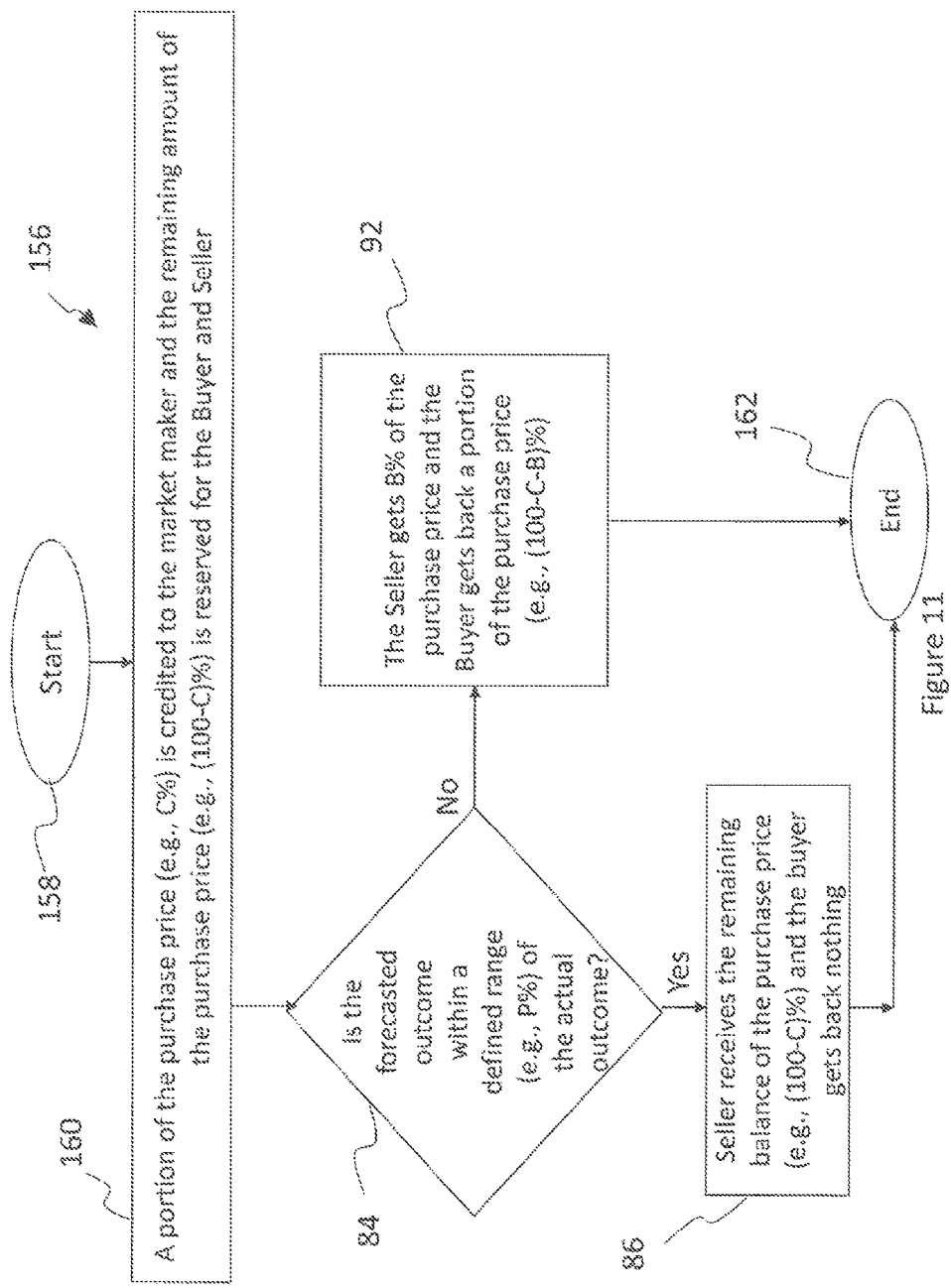
FIG. 11 is a flowchart of an embodiment of a method for distributing a purchase price to a market maker, buyer, and seller.

FIG. 11 is a flowchart of an embodiment of a method 156 for distributing a purchase price to a market maker, buyer, and seller. The method 156 is similar to the method 80 of FIG. 8. Common reference numerals are used to describe similar blocks. For sake of simplicity, the discussion of FIG. 11 focuses on the differences. Generally, the method 156 distributes the purchase price among the market maker, buyer, and predictor. Whereas, the method 80 (FIG. 8) begins after the market maker has been credited a portion of the purchase price and thus, the method 80 distributes the remaining balance of the purchase price to the predictor and buyer. In more detail, the method 156 starts at block 158. Then the method 156 proceeds to block 160 where a portion of the purchase price, for example a defined percentage of the purchase price (e.g., C %) is credited to the market maker and the remaining amount of the purchase price (e.g., 100−C) % is reserved for the buyer and seller. As discussed above, the defined percentage of the purchase price (e.g., C %) may be determined by different market participants, either separately or in combination, or may be determined by entirely unaffiliated entities, and in other ways.

From block 160 the method 156 continues to block 84 to determine whether the forecasted outcome falls within a defined range (e.g., ±P %) of the actual outcome. As discussed above with respect to method 80 of FIG. 8, the method 156 may then proceed to either of blocks 86 and 92, and then to the end of the method 156 at block 162.

Figure 12:
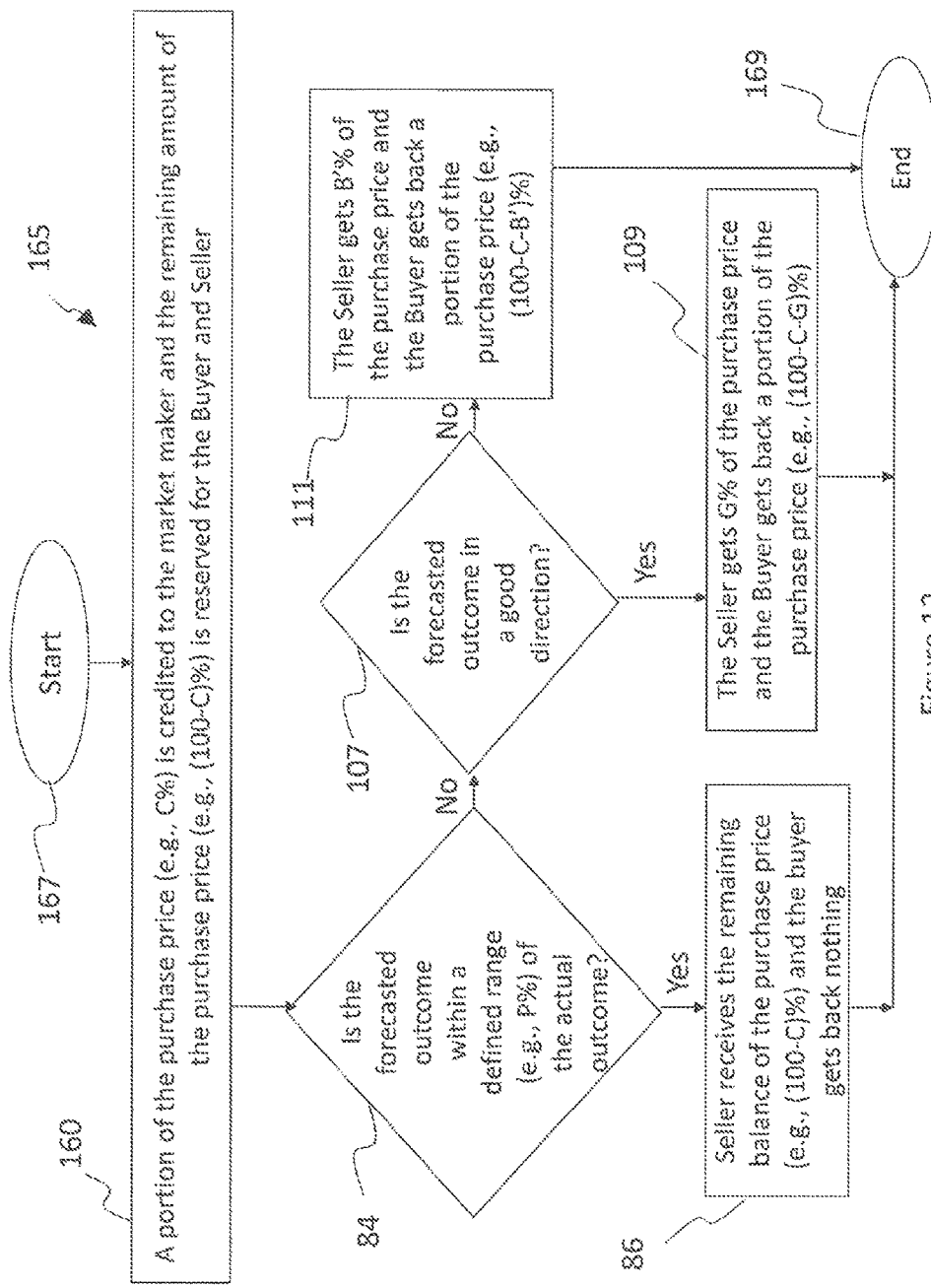
FIG. 12 is a flowchart of an alternative embodiment of a method for distributing a purchase price to a market maker, buyer, and seller.

FIG. 12 is a flowchart of an alternative embodiment of a method 165 for distributing a purchase price to a market maker, buyer, and seller. The method 165 is similar to the method 101 of FIG. 9. Common reference numerals are used to describe similar blocks. For sake of simplicity, the discussion of FIG. 12 focuses on the differences.

Generally, the method 165 distributes the purchase price among the market maker, buyer, and predictor. Whereas, the method 101 (FIG. 9) begins after the market maker has been credited a portion of the purchase price and thus, the method 101 distributes the remaining balance of the purchase price to the predictor and buyer. In more detail, the method 165 starts at block 167. Then the method 165 proceeds to block 160 where a portion of the purchase price, for example a defined percentage of the purchase price (e.g., C %) is credited to the market maker and the remaining amount of the purchase price (e.g., 100−C) % is reserved for the buyer and seller. As discussed above, the defined percentage of the purchase price (e.g., C %) may be determined by different market participants, either separately or in combination, or may be determined by entirely unaffiliated entities, and in other ways.

From block 160 the method 165 continues to block 84 to determine whether the forecasted outcome falls within a defined range (e.g., ±P %) of the actual outcome. The method 165 may continue to block 86, as discussed above with respect to method 101 of FIG. 9, and then end at block 169. Also, the method 165 may continue to block 107, and then end to either of the blocks 109 and 111, as discussed above with respect to method 101 of FIG. 9. From either of the blocks 109 and 111, the method 165 proceeds to block 169 and ends.

Figure 13:
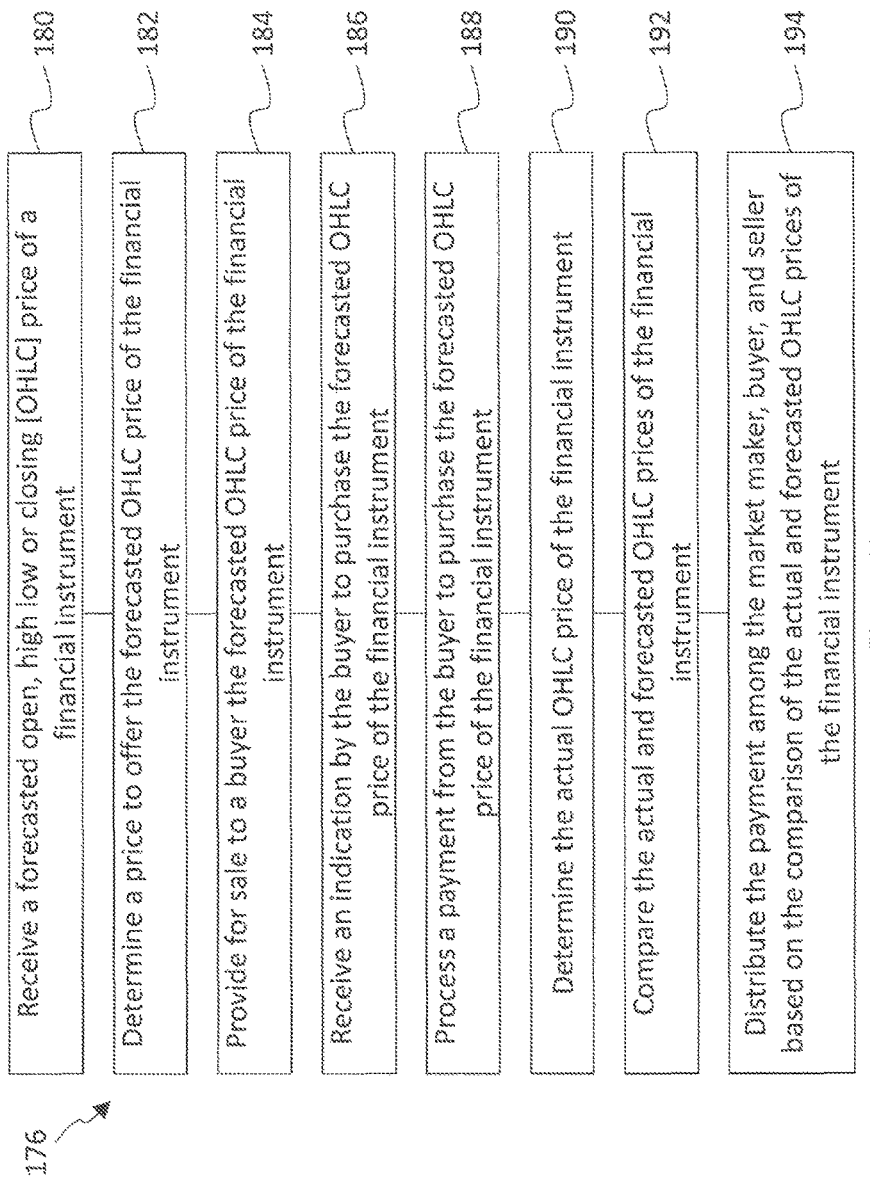
FIG. 13 is a flowchart of an embodiment of a method for providing a prediction-based marketplace for financial instruments.

FIG. 13 is a flowchart of an embodiment of a method 176 for providing a prediction-based marketplace for financial instruments. The method 176 begins, for example, at block 180 where the method 176 receives a forecasted OHLC price of a financial instrument. The method 176 then proceeds to block 182 and determines a price to offer the forecasted OHLC price of the financial instrument. From block 182 the method continues to block 184 where the method 176 provides for sale to a buyer the forecasted OHLC price of the financial instrument. The method 176 then continues to block 186 and receives an indication by the buyer to purchase the forecasted OHLC price of the financial instrument. From block 186, the method 176 advances to block 188 and processes a payment from the buyer to purchase the forecasted OHLC price of the financial instrument. The method 176 then proceeds to block 190 and determines the actual OHLC price of the financial instrument. The method 176 continues to block 192 where the method 176 compares the actual and forecasted OHLC prices of the financial instrument. Then, the method 176 moves to block 194 and distributes the payment among the market maker, buyer, and seller based on the comparison of the actual and forecasted OHLC prices of the financial instrument.

Figure 14:
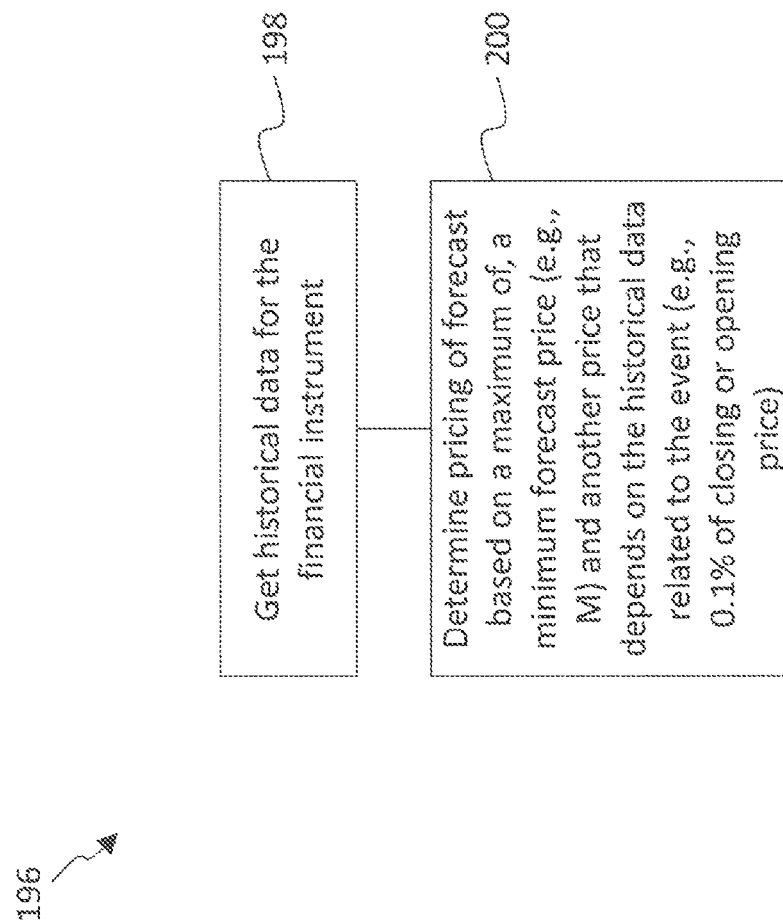
FIG. 14 is a flowchart of an embodiment of a method for pricing a forecast for a financial instrument.

FIG. 14 is a flowchart of an embodiment of a method 196 for pricing a forecast for a financial instrument. The method 196 begins, for example, at block 198. At block 198 the method 196 gets historical data for financial instrument. The method 196 proceeds to block 200 and determines pricing of the forecast based on a maximum of, a minimum forecast price (e.g., M) and another price that depends on the historical data related to the event (e.g., 0.1% of closing or opening price).

Figure 15:
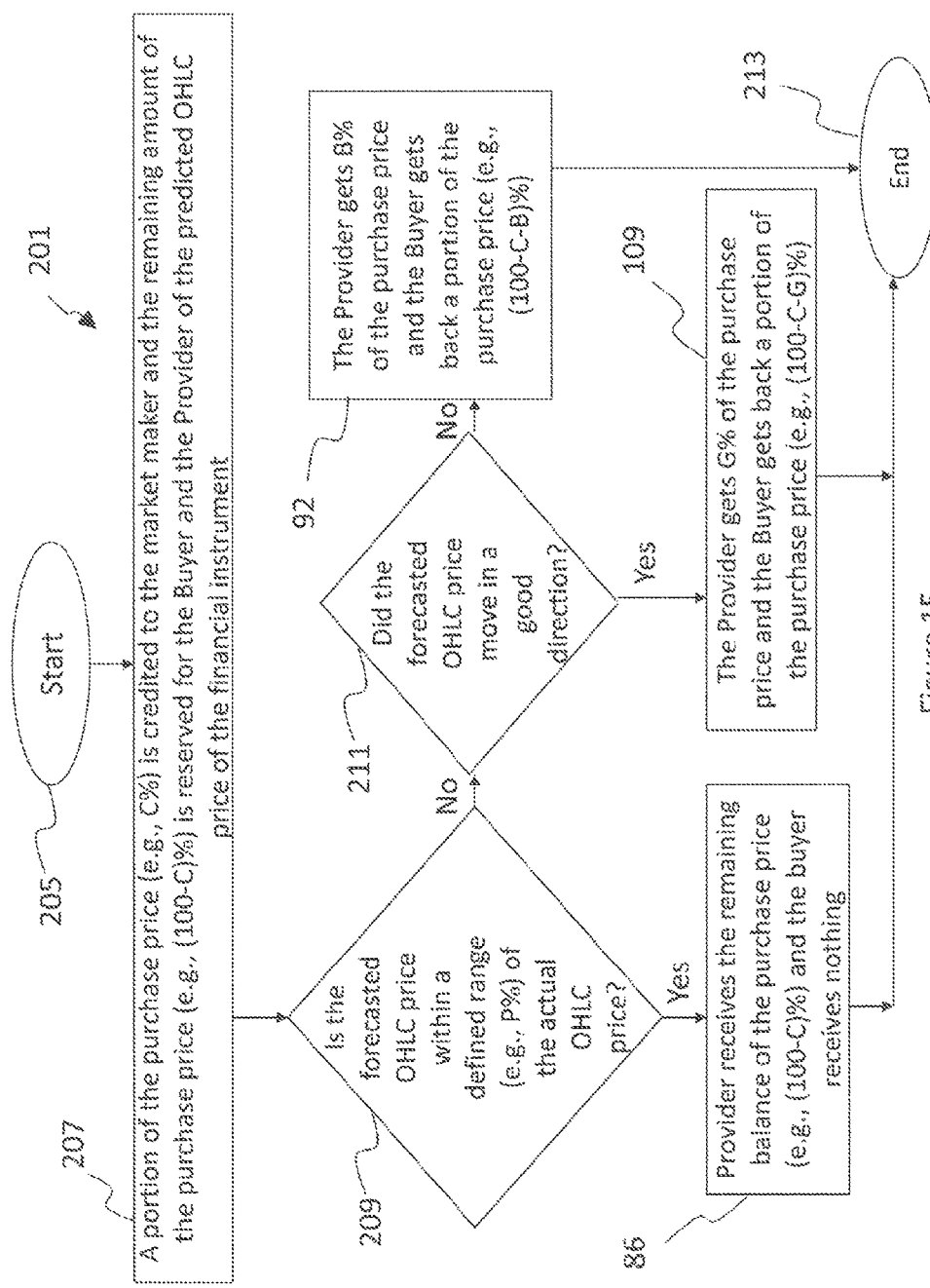
FIG. 15 is a flowchart of an embodiment of a method for distributing a purchase price for a forecasted OHLC price of a financial instrument to a buyer and provider.

FIG. 15 is a flowchart of an embodiment of a method 201 for distributing a purchase price for a forecasted OHLC price of a financial instrument to a buyer and provider. The method 201 starts, for example, at block 205. The method 201 proceeds to block 207 where a portion (e.g., C %) of the purchase price of the forecast is credited to the market maker and the remaining amount of the purchase price (e.g., 100−C) % is reserved for the buyer and the provider of the forecasted OHLC price of the financial instrument. The method 201 then continues on to block 209 and determines whether the forecasted OHLC price is within a defined range (e.g., ±P %) of the actual OHLC price. If the method 201 determines that the forecasted OHLC price is within a defined range (e.g., ±P %) of the actual OHLC price, then the method 201 continues to block 86. At block 86 the provider receives the remaining balance of the purchase price (e.g., (100−C) %) and the buyer receives nothing. From block 86 the method 201 proceeds to block 213 that is, for example, the end of the method 201. On the other hand, if the method 201 determines that the forecasted OHLC price falls outside a defined range (e.g., ±P %) of the actual OHLC price, then the method 201 continues to block 211. At block 211 the method 201 determines whether the forecasted OHLC price moved in a good direction. If the method 201 determines that the forecasted OHLC price moved in a good direction relative to the actual OHLC price of the financial instrument, then the method 201 moves from block 211 to block 109. At block 109, the provider gets G % of the purchase price and the buyer gets back a portion of the purchase price (e.g., (100−C−G) %). From block 109 the method 201 proceeds to block 213 that is, for example, the end of the method 201. On the other hand, if at block 211 the method 201 determines that the forecasted OHLC price did not move in a good direction (e.g., moved in an undesirable or bad direction), then the method 201 moves from block 211 to block 92. At block 92 the provider gets B % of the purchase price and the buyer gets back a portion of the purchase price (e.g., (100−C−B) %). From block 92 the method 201 proceeds to block 213 that is, for example, the end of the method 201.

Figure 16:
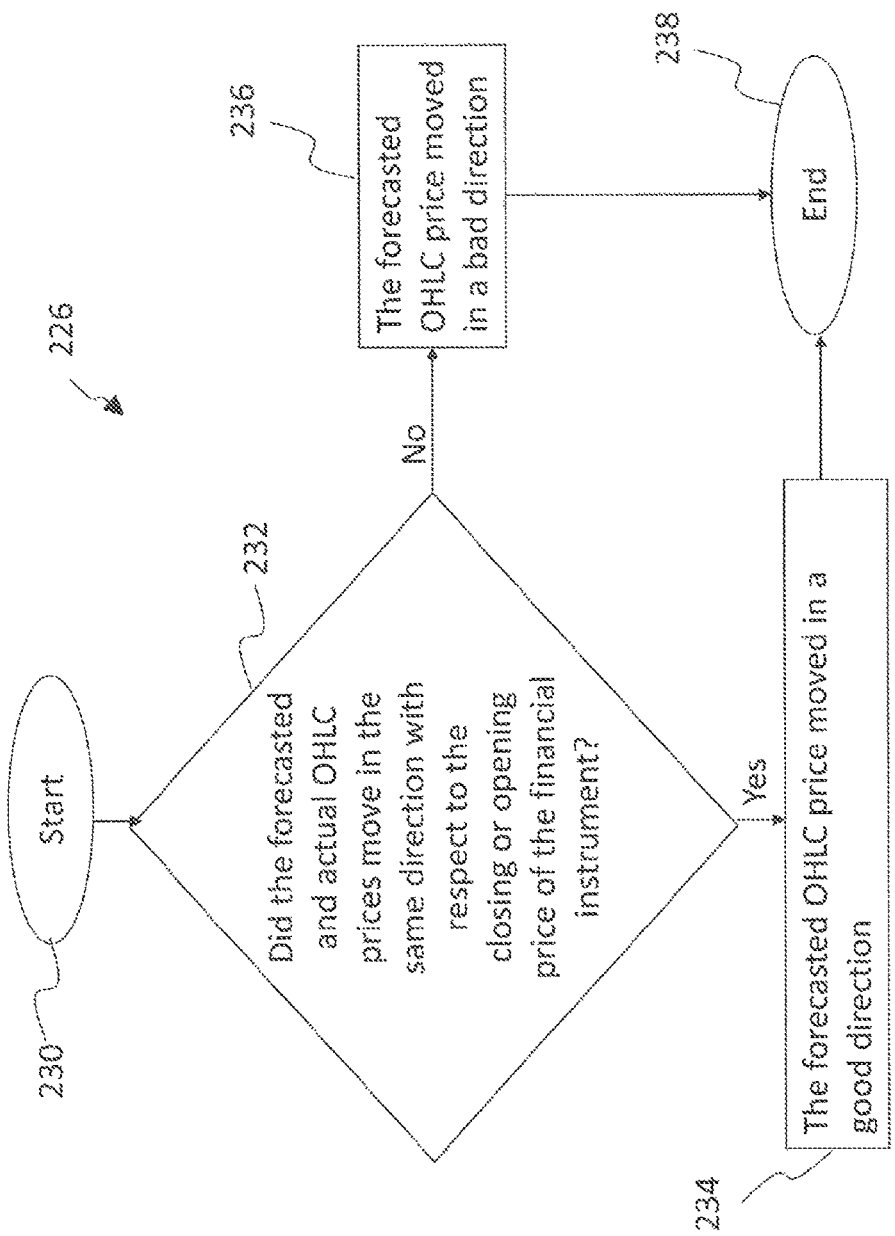
FIG. 16 is a flowchart of a method for determining the direction of a forecasted OHLC price of a financial instrument.

FIG. 16 is a flowchart of a method 226 for determining the direction of a forecasted OHLC price of a financial instrument. The method 226 begins, for example, at block 230. The method 226 then proceeds to block 232 and determines whether the predicted and actual OHLC prices moved in the same direction with respect to some base price of the financial instrument such as the closing price for yesterday or the opening price for today depending on when the prediction was made. If at block 232 the method 226 determines that the forecasted and actual OHLC prices moved in the same direction relative to some base price of the financial instrument, then the method 226 proceeds to block 234 and determines that the forecasted OHLC price moved in a good direction. From block 234 the method 226 moves to block 238 that is, for example, the end of the method 226. On the other hand, if at block 232 the method 226 determines that the forecasted and actual OHLC prices did not move in the same direction (e.g., moved in opposite directions) relative to some base price of the financial instrument (such as the closing price for yesterday or the opening price for today depending on when the prediction was made), then the method 226 proceeds to block 236 and determines that the forecasted OHLC price moved in a bad direction.

Now described is the operation of the disclosed embodiments. Referring to FIG. 1, a website may operate on the server 12. One or more of the clients 1, 2, . . . , L of the plurality of clients 18, which may be a desktop computer or mobile device (e.g., a phone, a tablet, a laptop, etc) can browse the network 17, for example the internet, and communicate with the website hosted by server 12. In one embodiment, the server 12 hosts a website that offers a prediction-based marketplace. The website hosted by the server 12 may be a regular browser version for desktops and laptops, for example. In some embodiments, the website hosted by the server 12 may be a mobile browser version for mobile computing devices such as, for example, smart phones. In yet other embodiments, the server 12 hosts regular and mobile browser versions. Further, in some embodiments one or more of the clients 1, 2, ..., L of the plurality of clients 18 may use a browser to interact with the server 12. In some embodiments, one or more of the clients 1, 2, ..., L of the plurality of clients 18 may use an application to interact with the server 12.

In some embodiments, the prediction-based marketplace that is hosted by server 12 may include a forecast of one or more events relating to financial instruments. In some instances, the one or more financial instruments may be readily tradable. Further, in some instances, the one or more financial instruments may include securities such as, for example stocks or bonds. In yet additional scenarios, the one or more financial instruments may include mutual funds. Moreover, in other examples the one or more financial instruments may include indexes, exchange traded funds (ETFs), commodities, loans, deposits, futures, or currency derivatives, etc. In yet further instances, the one or more financial instruments may include other types of financial instruments. In alternative embodiments, the prediction-based marketplace that is hosted by server 12 may include a forecast of other types of events. For example, in one embodiment the prediction-based marketplace includes forecasts relating to sporting event outcomes. For sake of simplicity, the following examples may focus on embodiments where the prediction-based marketplace includes forecasts of events relating to financial instruments. However, it is understood that alternative types of events may be forecasted and presented by the prediction-based marketplace that may be hosted by the server 12.

In operation, one or more of the clients 1, 2, ... L of the plurality of clients 18 browses the network 17, for example the internet, for the prediction-based marketplace that is hosted on the server 12. The server 12 may retrieve from database 13 information, including data, related to the prediction-based marketplace that is hosted on the server 12. Referring briefly to FIG. 2, in alternative embodiments, the server 12 may communicate with an additional server, such as, server 24. For example, the server 12 may retrieve from server 24 information, including data, that may be related to the prediction-based marketplace that is hosted on the server 12. For example, in one embodiment the prediction-based marketplace that is hosted on server 12 communicates with the server 24 for retrieving pricing information of financial instruments. For example, the server 12 may communicate with the server 24 to retrieve the previous daily OHLC price of a financial instrument. (e.g., the OHLC price of a stock). In other embodiments, the server 12 may communicate with the server 24 to retrieve some base price of a financial instrument (e.g., the closing or opening price of a stock). In other embodiments, the server 12 may communicate with the server 24 to retrieve other types of information, including data, that may be related to the prediction-based marketplace that is hosted on the server 12.

Still referring to FIG. 2, in some embodiments the server 24 communicates with a database 26 to retrieve information, including data. For example, in operation the server 12 may communicate with the server 24 to retrieve information (e.g. stock pricing) that may in turn be retrieved from the database 26.

In alternative embodiments, the prediction-based marketplace may be implemented in a distributed system. In some embodiments, the distributed system may be a cloud computing system. Referring now to FIG. 3, the prediction-based marketplace is hosted on a plurality of servers 33. For example, in some embodiments there may be multiple instances operating on the plurality of servers 33. In alternative embodiments, an instance of the prediction-based marketplace may be performed on one or more of the servers 1, 2, ..., and N that comprise the plurality of servers 33. The plurality of clients 18 may each interact with the prediction-based marketplace that is hosted by the one or more of the servers 1, 2, ..., and N. Further, the plurality of servers may retrieve information, including data, from databases 1, 2, ..., and M that comprise the plurality of servers 35. For example, any one of the servers in the plurality of servers 33 may communicate with any one of the databases in the plurality of databases 35 to retrieve information, including data, that may be related to the prediction-based marketplace.

For sake of simplicity, the following examples may focus on embodiments where the prediction-based marketplace is implemented in a system that most closely resembles the system of FIG. 1. However, it is understood that alternative the prediction-based marketplace described below may be implemented in alternative systems including, for example, the systems shown in FIGS. 2 and 3.

Now begins a discussion of the operation of the prediction-based marketplace that may be hosted on the server 12 (FIG. 1). Refer now to FIGS. 1 and 5. A user (e.g., a buyer or consumer) may use one or more of the clients 1, 2, ..., L of the plurality of clients 18 to browse the network 17, for example the internet, and interact with the prediction-based marketplace that is hosted on the server 12. The prediction-based marketplace that is hosted on the server 12 may present one or more forecasted outcomes, or predicted outcomes, of events for sale. For example, the server 12 may present for purchase to the user or buyer that may be using one or more of the clients 1, 2, ..., L, a forecast for an outcome of an event. (FIG. 4, block 42). In some embodiments, a forecasted outcome of an event is provided by an operator or owner of the prediction-based marketplace (e.g., a market maker). In other embodiments, the market maker may receive forecasts from third party suppliers. For example, other users (e.g., predictors or suppliers) of the prediction-based marketplace may provide the prediction-based marketplace with forecasts for event outcomes. In some embodiments, a third party may interact with the prediction-based marketplace in a similar manner as a user or buyer uses the one or more clients 1, 2, ..., L of the plurality of clients 18 and the server 12 (FIG. 1). For example, a predictor of a forecast may use one or more of the clients 1, 2, ..., L of the plurality of clients 18 such as a computing device to communicate with the server 12. Further, the server 12 may be configured to receive forecasts from a predictor. Moreover, the server 12 may be configured to manage an account of the predictor relating to the consideration (e.g., money) that the predictor receives from buyers of their forecasts. In yet additional embodiments, a user of the prediction-based marketplace may be a predictor (e.g., supplier of predictions) and a buyer (e.g., consumer of predictions). For example, the user may use one or more of the clients 1, 2, ..., L of the plurality of clients 18 to communicate with the server 12 to provide predictions and purchase predictions.

Further, the server may be configured to facilitate the establishment of a track record for predictors or providers of forecasts. For example, to establish a track record for a financial instrument, a predictor may publish free forecasts for the financial instrument for an arbitrary number of days, for example N number of days, that may be defined by the owner or operator of the prediction-based marketplace. Moreover, any user or buyer may buy forecasts for the financial instrument for the first N number of days at a without any charge. In this manner, the prediction-based marketplace may create a track record for a financial instrument. In addition, the prediction-based marketplace may create a track record for a given predictor of financial instruments.

Still referring to FIGS. 1 and 4, the server 12 is configured to allow a user to browse through the one or more predictions that are presented to the user via one or more of the clients 1, 2, . . . , L of the plurality of clients 18. The user may then select one or more predictions that the user would like to purchase. For example, the user may purchase one or more predictions using one or more of the clients 1, 2, . . . , L of the plurality of clients 18. For example, the server 12 may receive a purchase request from the buyer for one or more forecasts (FIG. 4, block 44). In some instances, the buyer may provide payment at the time of purchase. In other instances, the buyer may request that a purchase be made and payment may be handled at a different time. For example, the buyer may have an account with the prediction-based marketplace. Further, the buyer may have an account with a minimum amount of deposits on hand to purchase forecasts. Each time the buyer makes a purchase request for a forecast, the prediction-based marketplace that is hosted by server 12 may debit the buyer's account for the amount of the purchase price. In yet other embodiments, the prediction-based marketplace that is hosted by server 12 may put a hold on the buyer's account for the amount of the purchase price. Then, for example, at a later time the market may settle the buyer's account and debit the appropriate amount, which may be the same amount as the purchase price of the forecast, or a lesser amount, depending upon the actual outcome of the event.

After the buyer purchases a forecast from the prediction-based marketplace, the server 12 credits a portion of the purchase price (e.g., C %) to the operator or owner of the prediction-based marketplace (e.g., market maker) and reserves the remaining amount of the purchase price (e.g., (100–C) %) for the buyer and predictor (e.g., at block 46). In some embodiments, the server 12 credits the purchase price (e.g., C %) to the market maker soon after the buyer purchases a forecast. For example, if the buyer makes a payment at the time of purchase, the server 12 may transfer a portion of the purchase price (e.g., C %) over to the market maker. In other instances, the server 12 may create an accounting record that credits the market maker with a portion of the purchase price (e.g., C %) and debits the buyer's account so that the appropriate transactions can occur when payment is received by the buyer. In another embodiment, the server 12 may transfer a portion of the purchase price (e.g., C %) from a financial account established by the buyer over to the market maker. In alternative embodiments, the market maker may receive a portion of the purchase price (e.g., C %) in a different manner.

The server 12 determines the outcome of the event for which the forecast was purchased by the buyer (FIG. 4, block 48). In some embodiments, this information may be determined by retrieving information from the database 13. In other embodiments, this information may be retrieved elsewhere from databases or servers that may communicate with the server 12. Then, after the server 12 knows the outcome of the event for which the forecast was purchase the server 12 may then determine the amount that is due to the predictor of the event and the buyer of the event. For example, the server 12 may credit the amount of the remaining purchase price (e.g., (100–C) %) that is due to the buyer and predictor, depending on the actual outcome of the event that was forecasted (FIG. 4, block 50). In addition, for example, the predictor is rewarded for the accurateness of its forecast. Moreover, for example, the buyer may be credited a portion of the purchase price (e.g., "receive cash back") when the forecast is inaccurate. Alternative embodiments described below can provide more details regarding the distribution of the purchase price between the buyer and predictor.

Still referring to FIG. 1 and now referring to FIG. 5, in another embodiment the server 12 may be configured to receive from a predictor a forecast for an outcome of an event (block 54). For example, the server 12 may host a website that allows a predictor to provide one or more forecasts for outcomes associated with one or more events. The predictor, may provide a forecast to the server 12 using one or more of the clients 1, 2, . . . , L of the plurality of clients 18 to communicate with the server 12. For example, the predictor may access the server 12 using a computing device such as a desktop or mobile computing device. Further, the predictor may access the server 12 via the network 17. The predictor may also be a user or buyer of forecasted outcomes. In other instances, the predictor may be associated with the market maker, or owner or operator of the prediction-based marketplace. In other instances, the predictor may be a third party. For example, in some embodiments, the server 12 may be configured to receive one or more forecasted outcomes of one or more events from a third party. In other instances, the server 12 may be configured to receive one or more forecasted outcomes of one or more events from the market maker or owner or operator of the prediction-based marketplace. In some embodiments, the server 12 may be configured to receive an indication of one or more files that may include one or more forecasted outcomes of one or more events. In other embodiments, the server 12 may be configured to communicate with a database, for example database 13, for receiving from a predictor a forecast for an outcome of an event (block 54).

The server 12 may further be configured to store the forecast for the outcome of the event that is received by the predictor. For example, the server 12 may store the forecast in the database 13 (FIG. 1). In alternative embodiments, the server 12 may store in the database 13 an indication of the storage location of the forecast. In alternative embodiments, the server 12 may store the forecast received from the predictor in the server 12. In further embodiments, the server 12 may store the forecast received from the predictor in other components, such as in database 26 (FIG. 2) and one or more databases in the plurality of databases 35 (FIG. 3).

The server 12 may be further configured to determine the offer price of the forecast that is received from the predictor. (FIG. 5, block 58). For example, in some embodiments the server 12 determines the offer price of the forecast that is received from the predictor based on a desire purchase price that is indicated by the predictor. In alternative embodiments, the market maker (e.g., operator or owner of the prediction-based marketplace) may set the price of the forecast that is received from the predictor. In other instances, the price of the forecast may be based on historical data. For example, the price of the forecast may be based on the historical success of the predictor relative to the accurateness of their forecasts. In other examples, the price of the forecast may be based on the historical data relating to the event that is forecasted. In alternative embodiments, the price of the forecast may be based on additional information.

Referring to FIG. 6, now provided is a description that provides greater detail in one embodiment that the prediction-based marketplace may determine the offer price of a forecast (FIG. 5, block 58). For example, the server 12 may be configured to determine objective information related to the event that is being forecasted. For example, when the event is related to a financial instrument the server 12 may be configured to get objective information related to the performance or statistical analysis of the financial instrument. Further, the server 12 may be configured to use the objective information related to the event that is being forecasted to determine the offer price of the forecast. In one embodiment, the server 12 may be configured to determine pricing of the forecast based on a maximum of, a minimum forecast price (e.g., M) and another price that depends on the objective information related to the event (block 62). For example, the minimum forecast price (e.g., M) may be a predetermined minimum purchase price that is defined by the market maker, or owner or operator of the prediction-based marketplace. In other examples, the minimum forecast price (e.g., M) may be a predetermined minimum purchase price that is defined by the predictor that is providing the forecast. For example, the predictor may want a minimum price for the forecast. In some instances the minimum forecast price may be variable. Further, the minimum forecast price may be defined in advance of the server 12 receiving a forecast. In other instances, the minimum forecast price may be defined contemporaneously with the server 12 receiving a forecast. In yet other instances, the minimum forecast price may be defined after the server 12 receives a forecast.

Referring to FIG. 7, now provided is a description that provides greater detail in one embodiment that the prediction-based marketplace may determine the offer price of a forecast (FIG. 5, block 58). For example, the server 12 may be configured to receive or get historical data for the event that is being forecasted (block 66). For example, when the event is related to a financial instrument the server 12 may be configured to get historical data relating to the performance of the financial instrument (e.g., previous OHLC prices). Further, the server 12 may be configured to use the historical data for the event that is being forecasted to determine the offer price of the forecast. In one embodiment, the server 12 may be configured to determine pricing of the forecast based on a maximum of, a minimum forecast price (e.g., M) and another price that depends on the historical data related to the event. For example, the minimum forecast price (e.g., M) may be a predetermined minimum purchase price that is defined by the market maker, or owner or operator of the prediction-based marketplace. In other examples, the minimum forecast price (e.g., M) may be a predetermined minimum purchase price that is defined by the predictor that is providing the forecast. For example, the predictor may want a minimum price for the forecast. In some instances the minimum forecast price may be variable. Further, the minimum forecast price may be defined in advance of the server 12 receiving a forecast. In other instances, the minimum forecast price may be defined contemporaneously with the server 12 receiving a forecast. In yet other instances, the minimum forecast price may be defined after the server 12 receives a forecast.

Now referring back to FIGS. 4 and 5 (block 48), at some point the server 12 may be configured to determine the actual outcome of the event that may be forecasted. For example, in some embodiments the server 12 may receive the actual outcome of the event from the database 13. In other embodiments the server 12 may be configured to receive the actual outcome of the event from another database, such as the database 26 of FIG. 2. For example, the server 12 may be configured to communicate with the server 24 that may provide access to actual outcomes of events. In one example, the server 24 may provide actual outcomes of financial instruments, such as OHLC price of financial instruments. In some instances, the OHLC prices of the financial instruments may be stored in the database 26. Further, the server 12 may be configured to access the server 24 that may retrieve the actual outcome of a forecasted event from the database 26 and then communicate the actual outcome of that event to the server 12. In alternative embodiments, the server 12 may receive the actual outcome of the event from one or more databases that may be distributed.

Still referring to FIGS. 4 and 5, after the prediction-based marketplace determines the actual outcome of the forecasted event (e.g., at block 48) the prediction-based marketplace (e.g., at block 50) may credit the amount of the remaining purchase price (e.g., (100−C) %) that is due to the buyer and predictor, depending on the actual outcome. Recall, as discussed above, that the prediction-based marketplace may have previously credited a portion of the purchase price (e.g., C %) to the market maker and may have reserves the remaining amount of the purchase price (e.g., (100−C) %) for the buyer and predictor. (e.g., at block 46). In some instances, when the forecasted outcome of the event is closely accurate to the actual outcome of the event, the prediction-based marketplace may distribute the remaining purchase price (e.g., (100−C) %) to the predictor as a reward for accuracy. In some instances, when the forecasted outcome of the event is closely accurate to the actual outcome of the event, but not precisely the same, the prediction-based marketplace may distribute the remaining purchase price (e.g., (100−C) %) to both the predictor and the buyer of the forecast. For example, the predictor may receive a majority of the remaining purchase price while the buyer may receive a portion of the purchase price back (e.g., "cash back"). In other instances, when the difference between the forecasted and actual event outcomes exceeds a threshold, the predictor may receive a minority of the remaining purchase price while the buyer may receive a majority portion of the purchase price back (e.g., "cash back"). In alternative embodiments, the remaining portion of the purchase price (e.g., (100−C) %) may be distributed among the predictor and buyer in a manner that is different than described above. In addition, in one embodiment, the server 12 may be configured to credit the amount of the remaining purchase price (e.g., (100−C) %) that is due to the buyer and predictor, depending on the actual outcome. In alternative embodiments, such as embodiments that may be implemented in the system shown in FIG. 3, the plurality of servers may be configured 33 may be configured to credit the amount of the remaining purchase price (e.g., (100−C) %) that is due to the buyer and predictor, depending on the actual outcome.

Referring now to FIG. 8, now described in greater detail is an embodiment for crediting the amount of the remaining purchase price (e.g., (100−C) %) that is due to the buyer and predictor, depending on the actual outcome (FIGS. 4 and 5, block 50). For example, the prediction-based marketplace may determine whether the forecasted outcome is within a defined range (e.g., ±P %) of the actual outcome (block 84). Generally, the predictor's goal may be to forecast the outcome of an event within a range of P % (e.g., ±P %) of the actual outcome of the event. The range P % may be pre-defined or variable, and may be determined by the owner or operator of the prediction-based marketplace (e.g., the market maker). In other embodiments, P % may be determined by the predictor or buyer, or collectively by one or more of the market-maker, predictor, or buyer. In further embodiments, the defined range P % may be determined by additional information or by different third parties.

Further, the server 12 may be configured to determine whether the forecasted outcome is within a defined range (e.g., ±P %) of the actual outcome (block 84). For example, if the server 12, or more generally, the prediction-based marketplace determines that the forecasted outcome is within a defined range (e.g., ±P %) of the actual outcome, then in one embodiment the predictor receives the remaining balance of the purchase price (e.g., (100–C) %) and the buyer gets back nothing (block 86). On the other hand, if the server 12, or more generally, the prediction-based marketplace determined that the forecasted outcome is outside a defined range (e.g., ±P %) of the actual outcome, then in one embodiment predictor gets B % of the purchase price and the buyer gets back a portion of the purchase price (e.g., (100–C–B) %) (block 92). For example, in that scenario the buyer may get some cash back.

Now referring to FIG. 9, described in greater detail is an alternative embodiment for crediting the amount of the remaining purchase price (e.g., (100–C) %) that is due to the buyer and predictor, depending on the actual outcome (FIGS. 4 and 5, block 50). This embodiment is similar in some respects to the embodiment previously discussed, yet different in other respects. For sake of simplicity, the discussion below focuses on the differences. For example, the server 12 may determine whether the forecasted outcome falls within a defined range (e.g., ±P %) of the actual outcome (block 84). Generally, the predictor's goal may be to forecast the outcome of an event within a range of P % (e.g., ±P %) of the actual outcome of the event. If the server 12 determines that the forecasted outcome is outside a defined range (e.g., ±P %) of the actual outcome of the forecasted event, then the server 12 determines whether the forecasted outcome was in a good direction (block 107). For example, a forecasted outcome may be in a good direction when the forecast predicts an outcome that moves in the same direction as the actual outcome, relative to a starting or beginning position. For example, a forecasted OHLC price of a financial instrument may be in a good direction when it and the actual OHLC price of the financial instrument move in the same direction relative to some base price of the financial instrument such as the closing price for yesterday or the opening price for today depending on when the prediction was made. If the server 12 determines that the forecasted outcome moved in a good direction, the prediction-based marketplace may distribute the remaining purchase price (e.g., (100–C) %) so that the predictor gets G % of the purchase price and the buyer gets back a portion of the purchase price (e.g., (100–C–G) %) (block 109). For example, the server 12 may be configured to provide a portion (e.g., G %) of the remaining purchase price (e.g., (100–C) %) to the predictor and another portion (e.g., (100–C–G) %) as cash back to the predictor.

The value G may be a defined percentage of the purchase price (e.g., G %) and may be determined, for example, by the market maker. In alternative embodiments, the defined percentage of the purchase price (e.g., G %) may be determined by a consumer or buyer of the forecast. In yet another embodiment, the defined percentage of the purchase price (e.g., G %) may be determined by a predictor of the forecast. In further embodiments, the defined percentage of the purchase price (e.g., G %) may be determined by a combination of the market maker, the consumer or buyer, and the predictor. In some embodiments, the defined percentage of the purchase price (e.g., G %) may be determined in other ways.

On the other hand, if the server 12 determines that the forecasted outcome moved in an undesirable or bad direction (e.g., a direction opposite a good direction), the prediction-based marketplace may distribute the remaining purchase price (e.g., (100–C) %) so that the predictor gets B'% of the purchase price and the buyer gets back a portion of the purchase price (e.g., (100–C–B') %) (block 111). For example, the server 12 may be configured to provide a portion (e.g., B'%) of the remaining purchase price (e.g., (100–C) %) to the predictor and another portion (e.g., (100–C–B') %) as cash back to the buyer.

The value B' may be a defined percentage of the purchase price (e.g., B'%) and may be determined, for example, by the market maker. In alternative embodiments, the defined percentage of the purchase price (e.g., B'%) may be determined by a consumer or buyer of the forecast. In yet another embodiment, the defined percentage of the purchase price (e.g., B'%) may be determined by a predictor of the forecast. In further embodiments, the defined percentage of the purchase price (e.g., B'%) may be determined by a combination of the market maker, the consumer or buyer, and the predictor. In some embodiments, the defined percentage of the purchase price (e.g., B'%) may be determined in other ways.

Now referring to FIG. 10, described in more detail is the operation of another embodiment of a prediction-based marketplace. Still referring to FIG. 1, for example, the server 12 may be configured to facilitate the implementation of prediction-based marketplace. For example, the server 12 may host a website that may allow sellers of predictions to interact with the website and provide predictions for outcomes of events. Moreover, the server 12 may host a website that is configured to receive a prediction for an outcome of an event from a seller (block 135). For example, a seller of a prediction may use a computing device that may be on or more of the clients 1, 2, . . . , L of the plurality of clients 18 to interact with the server 12 via the network 17, for example the internet. In this manner, the seller of the prediction may provide to the server 12 a prediction for an outcome of an event. Further, in turn, the sever 12 may receive the prediction for the outcome of the event from the seller of the prediction. The server may then determine a price to offer the prediction for sale to a buyer that may be interested in purchasing the prediction (block 137). Ad described above, the prediction-based marketplace may determine the price to offer the prediction for sale in a number of different ways.

The server 12 may then provide for sale the prediction to the buyer (block 139). For example, the website that is hosted by the server 12 may present a list of predictions that are available for purchase. The buyer may use a computing device such as one or more of the clients 1, 2, . . . , L of the plurality of clients 18 to browse a listing of the predictions. Moreover, the buyer may provide an indication to purchase one or more of the predictions that may be presented by the website that is hosted by the server 12. Further, the server 12 may then receive an indication by the buyer to purchase the prediction (block 141). In some embodiments, the indication by the buyer may include payment for purchase of the prediction. In other embodiments, the indication by the buyer may include an authorization that the buyer may be charged for the purchase of the prediction. In additional embodiments, the indication by the buyer may include an authorization that the prediction-based marketplace may debit the purchase price of the prediction from an account that is maintained by the prediction-based marketplace for the buyer.

In addition, the server 12 may be configured to process a payment from the buyer (block 143). For example, the server 12 may be configured to process a payment from the buyer for the purchase of the prediction for which the buyer provided an indication to purchase the prediction. For example, when payment for the purchase may be received contemporaneously or subsequently to receiving the indication of the buyer for purchase of the prediction, the server 12 may process the payment when the payment is received. For example, the server 12 may be configured to receive payment by a variety of payment methods including credit card, debit card, and bank account transfers. Further, the server 12 may be configured to receive payment by additional methods.

Still referring to FIG. 10, the server 12 may further be operable to process a payment from the buyer (block 143). As discussed above, the plurality of servers may process payment from the buyer in numerous ways. For sake of brevity, only some examples are now presented. For example, the prediction-based marketplace may debit an account that it maintains for the buyer, may process a transaction for payment with the buyer's credit or debit card, or may process payment by bank transfer. In alternative embodiments, the server 12 may be operable to process a payment from the buyer in another way.

Further, the server 12 may be operable to determine the actual outcome of the event that is predicted (block 145). In some embodiments, the server 12 may retrieve the actual outcome of the event that is predicted from the database 13. In alternative embodiments, the server 12 may retrieve the actual outcome of the event from another server or database that may be connected to the network 17. Referring briefly to FIG. 2, in yet another embodiment the server 12 may be retrieve the actual outcome of the event that is predicted from the server 24. In one scenario, the server 12 may request the actual outcome of the predicted event from the server 24 by initiating a request over the network 17. In some embodiments, the server 24 may retrieve the actual outcome of the predicted event from the database 26.

Now referring back to FIG. 1, and still referring to FIG. 10, the server 12 may be operable to compare the actual and predicted outcomes of the event (block 147). For example, the server 12 may compare how close or accurate the predicted outcome was to the actual outcome. In some embodiments, the comparison be used to distribute the purchase price of the prediction across one or more market participants that may include, for example, the market maker, buyer (e.g., consumer), and the seller (e.g., predictor, forecaster, or provider of the prediction).

In addition, the server 12 may distribute the payment among the market maker, buyer, and seller based on the comparison of the actual and predicted outcomes (block 149). In some embodiments, the server 12 may distribute a fixed amount or percentage of the purchase price to the market maker for providing a prediction-based marketplace where buyers and sellers can transact predictions for outcomes of events. In alternative embodiments, the server 12 may distribute a variable amount of the purchase price to the market maker in exchange for providing a prediction-based marketplace. For example, the variable amount may depend on the accurateness of the predictions that are transacted. In this scenario, a market maker's share of the purchase price may be proportional to the accurateness of the prediction that is transacted. In other embodiments, the amount distributed to the market maker may depend on other factors or variables.

Further, the server 12 may distribute the remaining balance of the purchase price (e.g., the purchase price less the market maker's portion) among the predictor (e.g., seller) and the buyer of the prediction, based on the comparison of the actual and predicted outcomes. Generally, the server 12 may reward the seller for good predictions by providing the predictor with the majority, or in some instances the entirety, of the remaining balance of the purchase price. On the other hand, the server 12 may provide a cash back feature to the buyer for predictions that may not be as accurate as desired. In this scenario, the remaining balance may be distributed among the predictor and buyer in a manner such that the buyer receives a portion of the remaining balance as a cash back feature for purchasing a prediction that is not as accurate as desired while the predictor receives a portion of the remaining balance than is less than the entirety of the remaining balance.

Referring to FIGS. 1 and 11, now described in greater detail is an embodiment of the distribution of the purchase price among the market maker, buyer, and predictor. For example, the server 12 may credit a portion of the purchase price (e.g., C %) to the market maker and reserve the remaining amount of the purchase price (e.g., (100−C) %) for the buyer and seller (block 160). In an embodiment, the value C may be a defined amount that is determined by the market maker, or owner or operator of the prediction-based marketplace. In other embodiments, the value C may be defined by one or more of the market participants that may include, for example, the market maker, a buyer, and a seller. The server 12 may then determine whether the forecasted outcome falls within a defined range (e.g., ±P %) of the actual outcome (block 84). If the server 12 determines that the forecasted outcome falls within the defined range (e.g., ±P %) of the actual outcome, then the server 12 may distribute the remaining balance of the purchase price (e.g., (100−C) %) among the buyer and seller (block 86) in a manner so that the seller receives the remaining balance and the buyer receives nothing. On the other hand, if the server 12 determines that the forecasted outcome falls outside the defined range (e.g., ±P %) of the actual outcome, then the server 12 may distribute the remaining balance of the purchase price (e.g., (100−C) %) among the buyer and seller (block 92) in a manner so that the seller receives B % of the purchase price and the buyer receives back a portion of the purchase price (e.g., (100−C−B) %). The server 12 may provide a portion of the purchase price back to the buyer as a credit or cash back feature of the prediction-based marketplace.

Referring to FIGS. 1 and 12, now described in greater detail is an alternative embodiment of the distribution of the purchase price among the market maker, buyer, and predictor. In some respects, the following embodiment is similar to the embodiment just described while referring to FIG. 11. Therefore, for sake of clarity, this discussion focuses on the differences. Generally, the seller's goal may be to forecast the outcome of an event within a range of P % (e.g., ±P %) of the actual outcome of the event. The server 12 may take an alternative course of action when determining that the forecasted outcome falls outside a defined range (e.g., ±P %) of the actual outcome (block 84). For example, the server 12 may determine whether the forecasted outcome may be in a good direction (block 107). If the server 12 determines that the forecasted outcome is in a good direction, then the server 12 may distribute the remaining balance of the purchase price (e.g., (100−C−G) %) among the seller and buyer so that the seller gets G % of the purchase price and the buyer gets back a portion of the purchase price (e.g., (100−C−G)

%). On the other hand, if the server 12 determines that the forecasted outcome is not in a good (e.g., is in an undesirable or bad direction), then the server 12 may distribute the remaining balance of the purchase price (e.g., (100−C−G) %) among the seller and buyer so that the seller gets B'% of the purchase price and the buyer gets back a portion of the purchase price (e.g., (100−C−B') %) (block 111).

The examples described above may refer at times to the system shown in FIG. 1. However, it is understood that alternative embodiments of the methods disclosed herein may be implemented in the systems shown in FIGS. 2 and 3, as well as additional systems. Further, the disclosed discussion of embodiments is not limited to a particular type of system. To illustrate this, provided now is a description of an embodiment of a prediction-based marketplace for a financial instrument that may be implemented in a distributed, or cloud computing, system architecture as shown in FIG. 3.

The plurality of servers 33 may host a website that may be used by the prediction-based marketplace to interact with suppliers or sellers (e.g., predictors) and consumers (e.g., buyers) of predictions or forecasts for outcomes of events. For example, the plurality of servers 33 may operate different instances of the website. Moreover, the website for the prediction-based marketplace may be distributed amount the plurality of servers 33. Referring now to FIG. 13, in one embodiment of a prediction-based marketplace for predictions of financial instruments, the plurality of servers 33 may receive a forecasted OHLC price of a financial instrument (block 180). In some instances, the forecasted OHLC price of the financial instrument may be provided by the owner or operator (e.g., market maker) of the prediction-based marketplace. In other instances, the forecasted OHLC price of the financial instrument may be provided by a third party seller of predictions, such as an individual or a company that may provide forecasted OHLC prices of financial instruments. For example, a third party seller of predictions may interact with the prediction-based marketplace through one or more of the clients 1, 2, . . . , L of the plurality of clients 18. That one or more of the clients 1, 2, . . . , L may communicate with the secure network 31 and the plurality of servers 33 via the network 17, that may include, for example, the internet. In additional instances, the forecasted OHLC price of the financial instrument may be provided by the market maker and a third party.

The plurality of servers 33 may determine a price to offer the forecasted OHLC price of the financial instrument (block 182). For example, briefly referring to FIG. 14, in one embodiment, the plurality of server 33 determines historical data for the financial instrument (block 198). For example, the plurality of servers 33 may retrieve the opening price for the financial instrument that may be the historical data for the financial instrument. Moreover, the plurality of severs 33 may retrieve the previous day's closing price for the financial instrument that may be the historical data for the financial instrument. In addition, the plurality of servers 33 may retrieve the opening or closing price for the financial instrument over another period of time that may be the historical data for the financial instrument. In one embodiment, the plurality of servers 33 may retrieve historical information relating to the financial instrument from the plurality of databases 35. In other embodiments, the plurality of servers 33 may retrieve historical information relating to the financial instrument from other components, such as other servers or databases that may be in communication with the secure network 31, such as via the network 17, that may include, for example, the internet.

After the prediction-based marketplace has retrieved the historical data for the financial information, the plurality of servers 33 determines pricing of the financial forecast based on a maximum of, a minimum forecast price (e.g., M) and another price that depends on the historical data related to the event (e.g., 0.1% of closing or opening price) (block 200). For example, the minimum forecast price (e.g., M) may be a minimum amount that may depend, for example, on the country where the financial instrument is traded or located. For example, if the financial instrument is traded or located in the United States, M may be one US Dollar. Or, for example, if the financial instrument is traded or located in India, M could be ten Indian Rupees. The value M may represent the minimum amount that a buyer or consumer may pay for the purchase of a forecast for the OHLC price of financial. The prediction-based marketplace may take the maximum of the minimum forecast price M and another price (e.g., historical-based pricing) that depends on the historical data related the financial instrument. For example, the plurality of servers 33 may be configured to determine the historical-based pricing to be a number of basis points (e.g., 10 basis points or 0.1%) of the financial instrument's closing price for the previous day or the opening price for the same day for which the OHLC price of that financial instrument is forecasted. The prediction-based marketplace may then take the maximum or greater amount of this historical-based pricing and the minimum forecast price M, to determine the pricing of the forecasted OHLC price of the financial instrument. In this manner, the prediction-based marketplace may guarantee that a minimum forecast price M may be determined regardless of what the historical-based pricing may be.

In alternative embodiments, pricing may be based on other objective information related to the financial instrument. For example, pricing may be based on the historical volatility of the financial instrument over a period of time. In other instances, pricing may be based on average or statistical OHLC prices of the financial instrument. In yet other embodiments, pricing may be based on the volume of trading for that financial instrument. Further, there may be addition objective information and historical information that may be used in determining pricing. In yet other embodiments, the prediction-based marketplace may determine pricing based on the minimum forecast price and may not determine pricing based on the objective-based or historical-based pricing. In other instances, the prediction-based marketplace may determine pricing based on the objective-based or historical-based pricing and may not determine pricing based on the minimum forecast price.

Referring back to FIGS. 13 and 15, the plurality of servers 33 may provide for sale to a buyer the forecasted OHLC price of the financial instrument (block 182) after the pricing is determined (block 184). For example, the plurality of servers 33 may host a website that provides a listing or presentation of financial instruments for which forecasted OHLC prices may be purchased. In one embodiment, a buyer or consumer may browse the website to review the listing or presentation. Further, in an embodiment the buyer may not see the forecasted OHLC prices until the buyer agrees to purchase the forecasted OHLC price. For example, the buyer may provide an indication to purchase the forecasted OHLC price of a financial instrument that is presented by the website. The plurality of servers 33 may receive the indication by the buyer to purchase the forecasted OHLC price of the financial instrument (block 186). As discussed above, a buyer's indication to purchase a forecast may or may not include or be accompanied by a payment. For example, in some instances the indication includes authorization to debit an account that is maintained by the prediction-based marketplace. In other embodiments, the indication may be included or may be accompanied by a payment (e.g., credit card payment, bank transfer, etc.) that may be processed by the prediction-based marketplace. In yet another embodiment, the indication may include an agreement, promise, or acceptance by the buyer that it may be obligated to pay the purchase price for the forecasted OHLC price at a later time. Further, the agreement, promise, or acceptance by the buyer may include an obligation to pay a portion of the purchase price that may be determined after the actual OHLC price of the financial instrument is known, and when the buyer may receive a portion of the purchase price back as cash back.

The plurality of servers 33 may then process a payment from the buyer to purchase the forecasted OHLC price of the financial instrument. As discussed above, the plurality of servers 33 may process payment from the buyer in numerous ways. For sake of brevity, only some examples are now presented. For example, the prediction-based marketplace may debit an account that it maintains for the buyer, may process a transaction for payment with the buyer's credit or debit card, or may process payment by bank transfer.

The plurality of servers 33 may then determine the actual OHLC price of the financial instrument (block 190). For example, in some embodiments the plurality of servers 33 may receive the actual OHLC price of the financial instrument from the plurality of databases 35. In other embodiments, the plurality of servers 33 may communicate with one or more other servers or databases to retrieve the actual OHLC prices of financial instruments. Further, the plurality of servers 33 may compare the actual and forecasted OHLC prices of the financial instrument (block 192). The comparison between the actual and forecasted OHLC prices of the financial instrument may be used to generate a rating for the predictor or provider of the respective forecasts. Further, the comparison between the actual and forecasted OHLC prices of the financial instrument may be used to determine how the purchase price of a forecasted OHLC price may be distributed among the market maker, buyer, and seller of the forecasted OHLC price.

For example, the plurality of servers 33 may distribute the payment among the market maker, buyer, and seller based on the comparison of the actual and forecasted OHLC prices of the financial instrument (block 194). Now refer to FIG. 15 for a more detailed discussion regarding distribution of the purchase price to the prediction-based market participants. The plurality of servers 33 may provide a portion of the purchase price (e.g., C %) to the market maker and the remaining amount of the purchase price (e.g., 100–C) % may be reserved for the buyer and the provider of the predicted OHLC price of the financial instrument (block 207). In alternative embodiments, the prediction-based marketplace may credit a portion of the purchase price to the market maker until payment from the buyer is received. In alternative embodiments, the prediction-based marketplace may provide a portion of the purchase price to the market maker earlier in time. For example, the market maker's portion of the purchase price may be distributed or credited upon or after receiving the indication by the buyer to purchase the forecasted OHLC price of the financial instrument. In other embodiments, the market maker's portion of the purchase price may depend on variables, including for example, but not limited to, the rating of the predictor or provider, the forecasted OHLC price, the actual OHLC price, etc.

In an embodiment, the market maker receives a defined portion (e.g., C %) of each transaction (e.g., purchases of forecasted OHLC prices of financial instruments). The value C may be defined by the market maker, or owner or operator of the prediction-based marketplace. Further, the value C may vary as desired. Moreover, the value C may vary for different financial instruments.

The plurality of servers 33 may determine whether the forecasted OHLC price is within a defined range (e.g., ±P %) of the actual OHLC price (block 209). Generally, the provider's goal may be to forecast the OHLC price of a financial instrument within a range of P % (e.g., ±P %) of the actual OHLC price of the financial instrument. As previously discussed, the value P may vary. Further, the value P may be defined by any one or a combination of the market maker, buyer, and seller (e.g., provider) of a financial instrument. Moreover, the value P may vary for different financial instruments. If the plurality of servers 33 determines that the forecasted OHLC price fell within a defined range (e.g., ±P %) of the actual OHLC price, then the plurality of servers 33 may determine that the provider receives the remaining balance of the purchase price (e.g., (100–C) %) and the buyer receives nothing. In other words, the prediction-based marketplace may determine that the forecasted OHLC price was a good forecast, and was valuable to the buyer and thus provides the provider (e.g., seller) of the forecast the entire remaining amount of the purchase price after the market maker's take of C % of the purchase price.

On the other hand, if the plurality of servers 33 determines that the forecasted OHLC price is outside a defined range (e.g., ±P %) of the actual OHLC price, then the plurality of servers 33 may determine that the buyer receives back a portion of the purchase price. In other words, the prediction-based marketplace may determine that the forecasted OHLC price was not as good a forecast as desired, and thus may provide a portion of the purchase price back to the buyer. For example, this may be described as a cash back feature of the prediction-based marketplace. The plurality of servers 33 may determine the portion of the purchase price to credit back to the buyer (e.g., amount of cash back), by evaluating the direction of the forecasted and actual OHLC prices relative to some base price of the financial instrument that was forecasted (such as the closing price for yesterday or the opening price for today depending on when the prediction was made). For example, in one embodiment, the plurality of servers 33 determines whether the forecasted OHLC price moved in a good direction. If the plurality of servers 33 determines that the forecasted OHLC price moved in a good direction, then the prediction-based marketplace may distribute the purchase price in a manner so that the provider gets G % of the purchase price and the buyer gets back a portion of the purchase price (e.g., (100–C–G) %) (block 109). In other words, the buyer may get a credit or cash back that is valued at, for example, (100–C–G) % of the purchase price of the forecasted OHLC price of the financial instrument, while the market maker and predictor respectively receive, for example, C % and G % of the purchase price.

The value G may be a defined percentage of the purchase price (e.g., G %) and may be determined, for example, by the market maker. In alternative embodiments, the defined percentage of the purchase price (e.g., G %) may be determined by a consumer or buyer of the forecast. In yet another embodiment, the defined percentage of the purchase price (e.g., G %) may be determined by a predictor of the forecast. In further embodiments, the defined percentage of the purchase price (e.g., G %) may be determined by a combination of the market maker, the consumer or buyer, and the predictor. In some embodiments, the defined percentage of the purchase price (e.g., G %) may be determined in other ways.

On the other hand, if the plurality of servers 33 determines that the forecasted OHLC price moved in an undesirable or bad direction, then the prediction-based marketplace may distribute the purchase price in a manner so that the provider gets B % of the purchase price and the buyer gets back a portion of the purchase price (e.g., (100−C−B) %) (block 92). In other words, the buyer may get a credit or cash back that is valued at, for example, (100−C−B) % of the purchase price of the forecasted OHLC price of the financial instrument, while the market maker and predictor respectively receive, for example, C % and B % of the purchase price.

The value B may be a defined percentage of the purchase price (e.g., B %) and may be determined, for example, by the market maker. In alternative embodiments, the defined percentage of the purchase price (e.g., B %) may be determined by a consumer or buyer of the forecast. In yet another embodiment, the defined percentage of the purchase price (e.g., B %) may be determined by a predictor of the forecast. In further embodiments, the defined percentage of the purchase price (e.g., B %) may be determined by a combination of the market maker, the consumer or buyer, and the predictor. In some embodiments, the defined percentage of the purchase price (e.g., B %) may be determined in other ways.

The prediction-based marketplace may determine the direction of a forecasted OHLC price of a financial instrument in different ways. For example, refer now to FIGS. 3 and 16 for a more detailed description of an embodiment for determining the direction of a forecasted OHLC price of a financial instrument. The plurality of servers 33 may determine whether the forecasted and actual OHLC prices moved in the same direction with respect to some base price of the financial instrument (block 232). For example, if the actual OHLC price of the financial instrument increases relative to the closing or opening price of the financial instrument and the forecasted OHLC price is greater than the closing or opening price, then the plurality of servers 33 may determine that the forecasted OHLC price moved in a good direction with respect to the closing or opening price of the financial instrument (block 234). On the other hand, if the actual OHLC price of the financial instrument increases relative to the closing or opening price of the financial instrument and the forecasted OHLC price is less than the closing or opening price, then the plurality of servers 33 may determine that the forecasted OHLC price moved in an undesirable or bad direction with respect to the opening price of the financial instrument (block 236).

Similarly, if the actual OHLC price of the financial instrument decreases relative to the closing or opening price of the financial instrument and the forecasted OHLC price is less than the closing or opening price, then the plurality of servers 33 may determine that the forecasted OHLC price moved in a good direction with respect to the closing or opening price of the financial instrument (block 234). On the other hand, if the actual OHLC price of the financial instrument decreases relative to the closing or opening price of the financial instrument and the forecasted OHLC price is greater than the closing or opening price, then the plurality of servers 33 may determine that the forecasted OHLC price moved in an undesirable or bad direction with respect to the opening price of the financial instrument (block 236).

The systems shown in FIGS. 1-3 and components described above may be implemented in hardware, software, and/or a combination thereof. Further, each system or component in the systems of FIGS. 1-3 may be implemented by a plurality of computing devices (e.g., desktops, servers, workstations, etc.) or by a single computer. Further, the methods of FIGS. 4-16 described above may also be performed by a plurality of computing devices or a single computer. For example, the portions of the methods may be distributed across a plurality of components throughout a system that may implement the method. The components of the systems may be co-located or remotely located from one another.

Although embodiments of the present disclosure have been described in detail, those skilled in the art should understand that they may make various changes, substitutions, alterations, and alternatives herein without departing from the spirit and scope of the present disclosure. Accordingly, such changes, substitutions, alterations, and alternatives are intended to be included within the scope of the present disclosure as defined in the following claims.

What is claimed is:

1. A system comprising:
one or more computer servers including one or more processing units operable to:
receive a prediction for an outcome of an event from a seller wherein the prediction is a form of a prediction vector having a direction and a magnitude;
receive historical data related to the event;
determine objective information based on the historical data, wherein the objective information is in an opening-high-low-closing (OHLC) data structure;
determine a minimum price to offer the prediction based on market maker input wherein the minimum price is in a minimum price data structure;
transform the objective information in the OHLC data structure and the minimum price in the minimum price data structure into a price for the prediction wherein the price is in a prediction price data structure;
provide the price for the prediction to a buyer;
receive an indication by the buyer and the buyer purchases the prediction wherein the indication is in an indication data structure and is manipulated based on input from the buyer;
process a payment from the buyer for the buyer to purchase the prediction;
determine the actual outcome of the event that is predicted;
compare the actual outcome of the event with a previous state for the event, by determining any change in the magnitude and direction;
determine a difference between the any change in the magnitude and direction and the prediction vector of the event; and distribute the payment to the buyer and seller and the amount distributed to the seller is inversely proportional to the difference and the amount distributed to the buyer is directly proportional to the difference.

2. The system of claim 1,
wherein the event is related to the value of a financial instrument, wherein
the historical data includes a percentage of one of the opening and the closing price of the financial instrument, and
wherein the minimum price is predetermined by a market maker.

3. The system of claim 2, wherein the one or more processing units is operable to distribute the payment in a manner so that the buyer receives a first portion of the payment and the seller receives a second portion of the payment, in response to movement in a good direction, and the buyer receives a third portion of the payment and the seller receives a fourth portion of the payment, in response to movement in a bad direction, wherein the first portion is less than the third portion and the second portion is more than the fourth portion.

4. The system of claim 1, wherein the one or more processing units is operable to distribute the payment in a manner so that the buyer receives a first portion of the payment and the seller receives a second portion of the payment, in response to the difference of the actual and predicted outcomes falling outside of a first range.

5. The system of claim 4 wherein the one or more processing units is operable to distribute the payment in a manner so that the buyer receives a third portion of the payment and the seller receives a fourth portion of the payment, in response to the difference of the actual and predicted outcomes falling within the first range and outside of a second range, wherein the first range is greater than the second range, wherein the third portion is less than the first portion, and wherein the fourth portion is more than the second portion.

6. The system of claim 1, wherein the one or more processing units is operable to distribute the payment in a manner so that the buyer receives a first portion of the payment, the seller receives a second portion of the payment, a market maker receives a third portion of the payment, and wherein the sum of the first, second, and third portions equals the amount of the payment from the buyer.

7. An apparatus comprising:
one or more computer-readable storage structures for storing a plurality of computer instructions executable by a processor, the plurality of computer instructions including:
instructions for receiving a prediction for an outcome of an event from a seller wherein the prediction is in a form of a prediction vector having a direction and a magnitude;
instructions for receiving historical data related to the event;
instructions for determining objective information based on the historical data, wherein the objective information is in an OHLC data structure;
instructions for determining a minimum price to offer the prediction based on market maker input wherein the minimum price is in a minimum price data structure;
instructions for transforming the objective information in the OHLC data structure and the minimum price in the minimum price data structure into a price for the prediction wherein the price is in a prediction price data structure;
instructions for providing the price for the prediction to a buyer;
instructions for receiving an indication by the buyer and the buyer purchases the prediction wherein the indication is in an indication data structure and is manipulated based on input from the buyer;
instructions for processing a payment for the buyer to purchase the prediction;
instructions for determining the actual outcome of the event that is predicted;
instructions for comparing the actual outcome of the event with a previous state for the event, by determining any change in the magnitude and direction;
determine a difference between the any change in the magnitude and direction and the prediction vector of the event;
and instructions for distributing the payment to the buyer and seller and the amount distributed to the seller is inversely proportional to the difference and the amount distributed to the buyer is directly proportional to the difference.

8. The apparatus of claim 7, wherein the instructions for determining the price to offer the prediction for sale to the buyer includes instructions for determining the price to offer the prediction for sale to the buyer based on the maximum of, a minimum price and another price that depends on the historical data related to the event.

9. The apparatus of claim 7,
wherein the event is related to the value of a financial instrument, wherein
the historical data includes a percentage of one of the opening and the closing price of the financial instrument,
wherein the minimum price is predetermined by a market maker, and
wherein the instructions for distributing the payment includes instructions for distributing the payment in a manner so that the buyer receives a first portion of the payment and the seller receives a second portion of the payment, in response to movement in a good direction, and so that the buyer receives a third portion of the payment and the seller receives a fourth portion of the payment, in response to movement in a bad direction, wherein the first portion is less than the third portion and the second portion is more than the fourth portion.

10. The apparatus of claim 7, wherein the instructions for distributing the payment in a manner so that the buyer and seller each receive a portion of the payment based on the comparison of the actual and predicted outcomes includes instructions for distributing the payment in a manner so that the buyer receives a first portion of the payment and the seller receives a second portion of the payment, in response to the difference of the actual and predicted outcomes falling outside of a first range, and instructions for distributing the payment in a manner so that the buyer receives a third portion of the payment and the seller receives a fourth portion of the payment, in response to the difference of the actual and predicted outcomes falling within the first range and outside of a second range, wherein the first range is greater than the second range, wherein the third portion is less than the first portion, and wherein the fourth portion is more than the second portion.

* * * * *